(12) United States Patent  (10) Patent No.: US 7,630,152 B1
Inata et al.  (45) Date of Patent: Dec. 8, 2009

(54) OPTICAL PICKUP DEVICE, AND OPTICAL DISC DEVICE

(75) Inventors: Masahiro Inata, Hyogo (JP); Kanji Wakabayashi, Kyoto (JP); Hironori Tomita, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/464,406

(22) Filed: May 12, 2009

(30) Foreign Application Priority Data

May 16, 2008 (JP) .............................. 2008-129405

(51) Int. Cl.
G02B 7/02 (2006.01)
G02B 15/14 (2006.01)
G02B 27/14 (2006.01)

(52) U.S. Cl. .................... 359/823; 359/824; 359/637; 359/694; 359/696; 396/75; 720/666; 250/201.5; 355/62

(58) Field of Classification Search ................ 359/823, 359/824, 694–698, 637; 396/72–79, 124, 396/142, 349, 439, 448, 554, 558; 348/240.99, 348/335; 720/666, 668; 353/30, 94; 355/52, 355/62; 250/201.5
See application file for complete search history.

(56) References Cited

U.S. PATENT DOCUMENTS 3,486,807 A * 12/1969 Pignone ....................... 355/62
5,491,684 A * 2/1996 Terashima et al. ........... 720/666
5,768,027 A * 6/1998 Takahashi .................... 359/637
6,473,567 B1 * 10/2002 Nakashima ................... 396/75
7,486,452 B2 * 2/2009 Kinoshita et al. ............ 359/813

FOREIGN PATENT DOCUMENTS

| JP | 2003-45068 | 2/2003 |
| JP | 2003-91847 | 3/2003 |
| JP | 2006-107587 | 4/2006 |

* cited by examiner

*Primary Examiner*—Loha Ben
(74) *Attorney, Agent, or Firm*—Wenderoth, Lind & Ponack, L.L.P.

(57) ABSTRACT

A guide shaft and a guide portion movably guide a lens holder for holding a collimator lens (i.e. correction lens) in an optical axis direction. A stepping motor rotates a screw shaft arranged in parallel to the optical axis direction. A nut member converts a rotating movement of the screw shaft into a rectilinear movement of the optical axis direction. An urging spring urges the lens holder against the guide shaft and the guide portion. The lens holder is driven in the optical axis direction along the guide shaft by the stepping motor, with a first contact portion and a second contact portion of the lens holder being contacted with the guide shaft, and a third contact portion of the lens holder being contacted with the guide portion by an urging force of the urging spring. The optical pickup device having the above arrangement allows for stable driving of a correction lens.

10 Claims, 14 Drawing Sheets

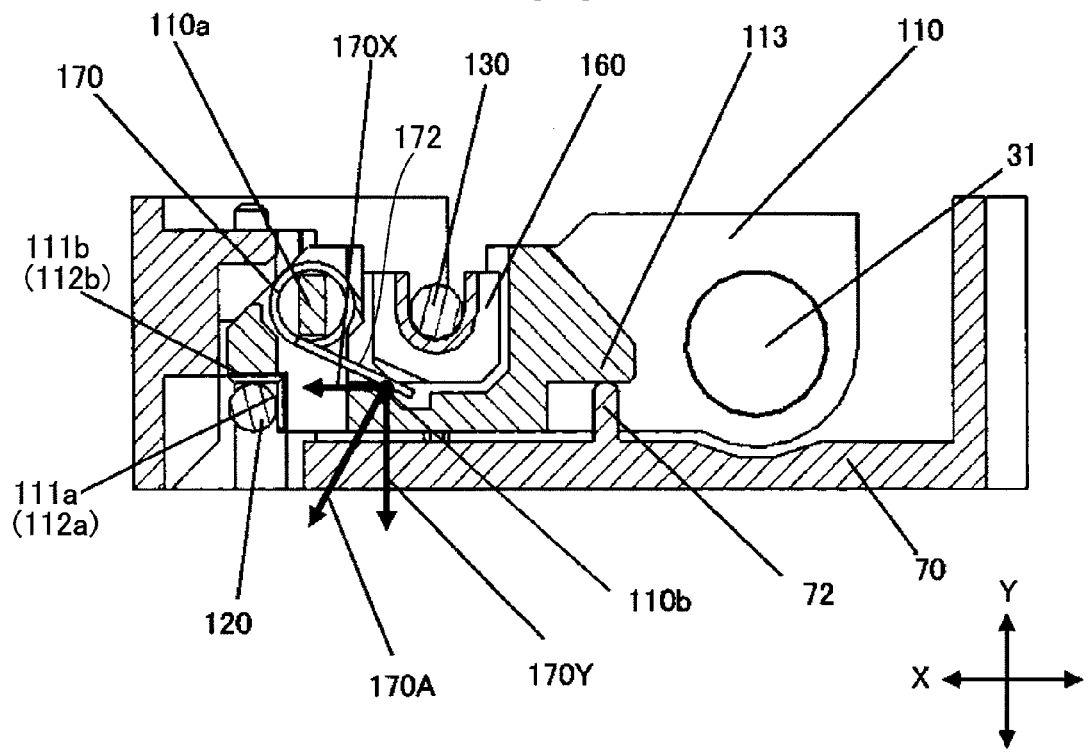
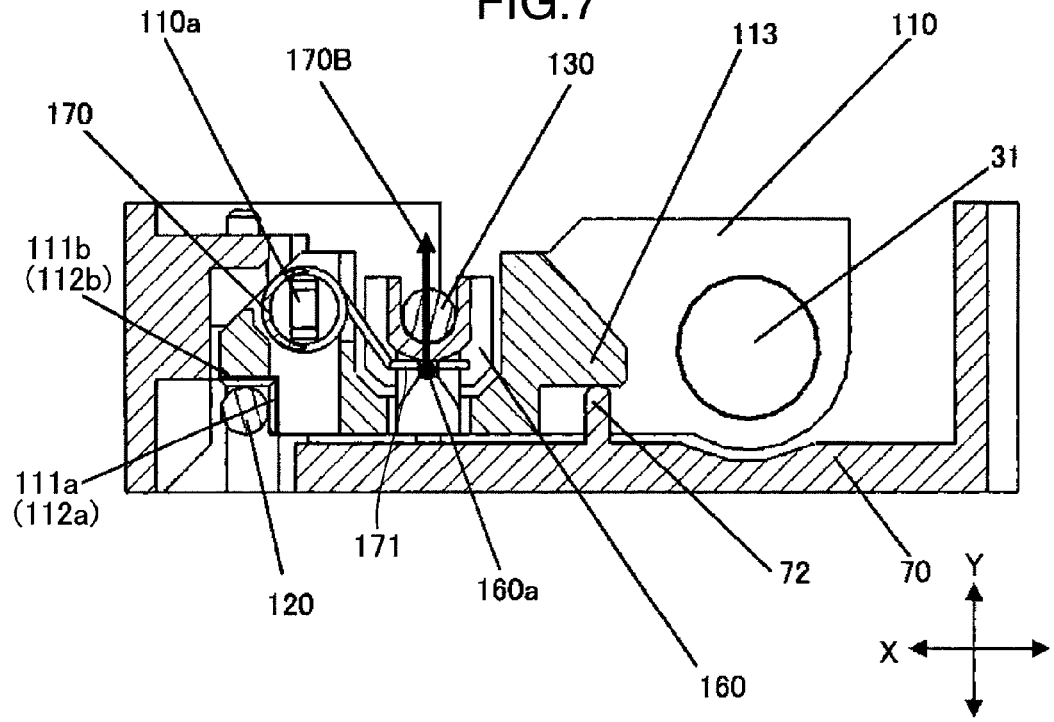

OPTICAL PICKUP DEVICE, AND OPTICAL DISC DEVICE

BACKGROUND OF THE INVENTION

1. Field of the Invention

The present invention relates to an optical pickup device for recording data in a disc-shaped data storage medium as represented by an optical disc and/or reproducing data from the data storage medium, and an optical disc device incorporated with the optical pickup device.

2. Description of the Background Art

Disc-shaped recording/reproducing media such as CD and DVD for recording or reproducing information with use of a light beam, flexible discs for recording or reproducing information using magnetism, and MO and MD for recording or reproducing information using a light beam and magnetism have been widely spread. In particular, owning to a large data capacity and a low cost, optical discs such as CD and DVD are widely spread as recording media for use in a computer, or recording media for recording video/music. In recent years, there is a demand for an optical disc having a larger data capacity, as the amount of data to be recorded in an optical disc is increased.

It is necessary to increase the recording density of data by reducing the size of a light spot to be defined by irradiation of light onto an optical disc in recording data in the optical disc and/or reproducing data from the optical disc in order to increase the data capacity of the optical disc. The size of a light spot can be reduced by using a light source for emitting laser light of a short wavelength, and increasing the numerical aperture (NA) of an objective lens in an optical pickup device. In an optical pickup device for emitting laser light on DVD, a light source having a wavelength of 650 nm, and an objective lens having a numerical aperture (NA) of 0.6 are used. Nowadays, with use of a blue laser having a wavelength of 405 nm, and an objective lens having NA of 0.85, BD (Blu-ray Disc) having a recording density five times of the recording density of a currently available DVD has been spread.

BD has multiple recording layers to increase the recording capacity, and a first recording layer and a second recording layer are formed with a predetermined interval in the disc thickness direction. A thickness variation of a cover layer of an optical disc through which laser light is transmitted may greatly affect the spherical aberration of an optical system having a large NA. Accordingly, a large spherical aberration may occur in switching the position of a light spot to be condensed from one recording layer to another recording layer. In order to correct the spherical aberration, a spherical aberration correcting mechanism is loaded in the optical pickup device, wherein a movable lens is provided on an optical path from a light source to an objective lens in an optical pickup device to correct the spherical aberration by driving the movable lens in the optical axis direction and adjusting the position of the movable lens.

FIG. 15 is a perspective view showing a schematic arrangement of a conventional spherical aberration correcting mechanism. Referring to FIG. 15, the spherical aberration correcting mechanism 200 includes a lens holder 220 for holding a movable lens 210, a main shaft 230 and an auxiliary shaft 240 for movably supporting the lens holder 220 in the optical axis direction (the arrow direction 200A and the arrow direction 200B) of the movable lens 210, a screw shaft 250 arranged substantially in parallel to the main shaft 230 and formed with a helical groove, a stepping motor 260 with a rotating shaft to be directly connected to the screw shaft 250, a rack member 270 which is mounted on the lens holder 220 in engagement with the helical groove of the screw shaft 250, and operable to convert a rotating movement of the screw shaft 250 into a rectilinear movement of the lens holder 220, and a photosensor 280 for detecting the position of a light blocking plate 220a mounted on the lens holder 220.

The spherical aberration correcting mechanism 200 is operable to move the lens holder 220 to an intended position along the main shaft 230 and the auxiliary shaft 240 in the optical axis direction (the arrow direction 200A and the arrow direction 200B) of the movable lens 210 by rotatably driving the stepping motor 260. Specifically, the spherical aberration correcting mechanism 200 is operable to correct a spherical aberration by rotatably driving the stepping motor 260 depending on a spherical aberration amount resulting from a thickness variation of a cover layer, or switching the position of a light spot between recording layers; and moving the movable lens 210 (see e.g. Japanese Unexamined Patent Publication Nos. 2003-45068A and 2003-91847A).

In the spherical aberration correcting mechanism 200, the lens holder 220 is guided by shaft engagement to drivingly move the lens holder 220 in the optical axis direction (the arrow direction 200A and the arrow direction 200B). Specifically, the main shaft 230 is engaged in two main shaft bearings (not shown) of the lens holder 220, and the auxiliary shaft 240 is engaged in a U-shaped auxiliary bearing 221 to restrain rotation of the lens holder 220 about an axis of the main shaft 230. In this arrangement, the lens holder 220 is guided in the optical axis direction (the arrow direction 200A and the arrow direction 200B).

As described above, in the conventional spherical aberration correcting mechanism 200, the lens holder 220 is guided by shaft engagement. Accordingly, engagement play is necessary between the main shaft 230 and the main shaft bearings to smoothly guide the lens holder 220 along the main shaft 230. Because of the engagement play, a contact point between the two main shaft bearings and the main shaft 230 is not uniquely defined, and the contact point is changed, as the lens holder 220 is driven. As a result, the lens holder 220 may be tilted with respect to the main shaft 230, and control of the lens holder 220 may be unstable due to shake of the movable lens 210.

In the guide arrangement using shaft engagement, it is necessary to assemble the parts after the two guide shafts (the main shaft 230 and the auxiliary shaft 240) are mounted on the lens holder 220 by shaft engagement, in loading the spherical aberration correcting mechanism 200 in the main body of the optical pickup device. This may deteriorate the assembling performance, and increase the number of assembling steps, with the result that the production cost may be increased.

SUMMARY OF THE INVENTION

In view of the above, it is an object of the present invention to provide an optical pickup device and an optical disc device capable of stably driving a correction lens.

An optical pickup device, for use with a light source and an optical disc, according to an aspect of the invention includes: a condensing optical system for condensing a light flux to be emitted from the light source onto the optical disc, the condensing optical system having a correction lens; a lens holder for holding the correction lens; a main guide member and an auxiliary guide member for movably guiding the lens holder in an optical axis direction of the correction lens, while supporting the lens holder; a feed screw arranged in parallel to the optical axis direction; a feed motor for rotating the feed screw; a nut member in engagement with the feed screw and for converting a rotating movement of the feed screw into a rectilinear movement of the lens holder in the optical axis direction; an urging member held on the lens holder and for urging the lens holder against the main guide member and the auxiliary guide member by engagement with the nut member; and an optical base for supporting the main guide member and the auxiliary guide member, wherein the lens holder includes a first contact portion to be contacted with the main guide member at a first position, a second contact portion to be contacted with the main guide member at a second position different from the first position, and a third contact portion to be contacted with the auxiliary guide member, the lens holder is driven in the optical axis direction along the main guide member by the feed motor, the first contact portion and the second contact portion are contacted by the main guide member, and the third contact portion is contacted by the auxiliary guide member via an urging force of the urging member.

In the above arrangement, the condensing optical system is operable to condense a light flux to be emitted from the light source on an optical disc. The condensing optical system has the correction lens. The lens holder holds the correction lens. The main guide member and the auxiliary guide member are operable to movably guide the lens holder in the optical axis direction of the correction lens, while supporting the lens holder. The feed screw is arranged in parallel to the optical axis direction. The feed motor is operable to rotate the feed screw. The nut member is in engagement with the feed screw and operable to convert a rotating movement of the feed screw into a rectilinear movement in the optical axis direction. The urging member is held on the lens holder and operable to urge the lens holder against the main guide member and the auxiliary guide member by engagement with the nut member. The optical base supports the main guide member and the auxiliary guide member. The lens holder includes the first contact portion to be contacted with the main guide member at the first position, the second contact portion to be contacted with the main guide member at the second position different from the first position, and the third contact portion to be contacted with the auxiliary guide member. The lens holder is driven in the optical axis direction along the main guide member by the feed motor, with the first contact portion and the second contact portion being contacted with the main guide member, and the third contact portion being contacted with the auxiliary guide member by the urging force of the urging member.

Since the lens holder for holding the correction lens is urged against the main guide member and the auxiliary guide member by the urging force of the urging member, there is no likelihood that play or backlash by shaft engagement may occur, unlike the conventional arrangement. Accordingly, the lens holder can be precisely driven along the main guide member and the auxiliary guide member. This enables to provide a mechanism for smoothly feeding a correction lens along a main guide member and an auxiliary guide member, and stably drive the correction lens while suppressing shake of the correction lens in driving the lens holder.

These and other objects, features and advantages of the present invention will become more apparent upon reading the following detailed description along with the accompanying drawings.

BRIEF DESCRIPTION OF THE DRAWINGS

FIG. 6 is a sectional view taken along a plane perpendicular to an optical axis direction of the spherical aberration correcting mechanism in the first embodiment of the invention, showing an engagement relation between a lens holder and an urging spring.

FIG. 7 is a sectional view taken along the plane perpendicular to the optical axis direction of the spherical aberration correcting mechanism in the first embodiment of the invention, showing an engagement relation between a nut member and the urging spring.

DETAILED DESCRIPTION OF THE PREFERRED EMBODIMENTS OF THE INVENTION

Figure 1:
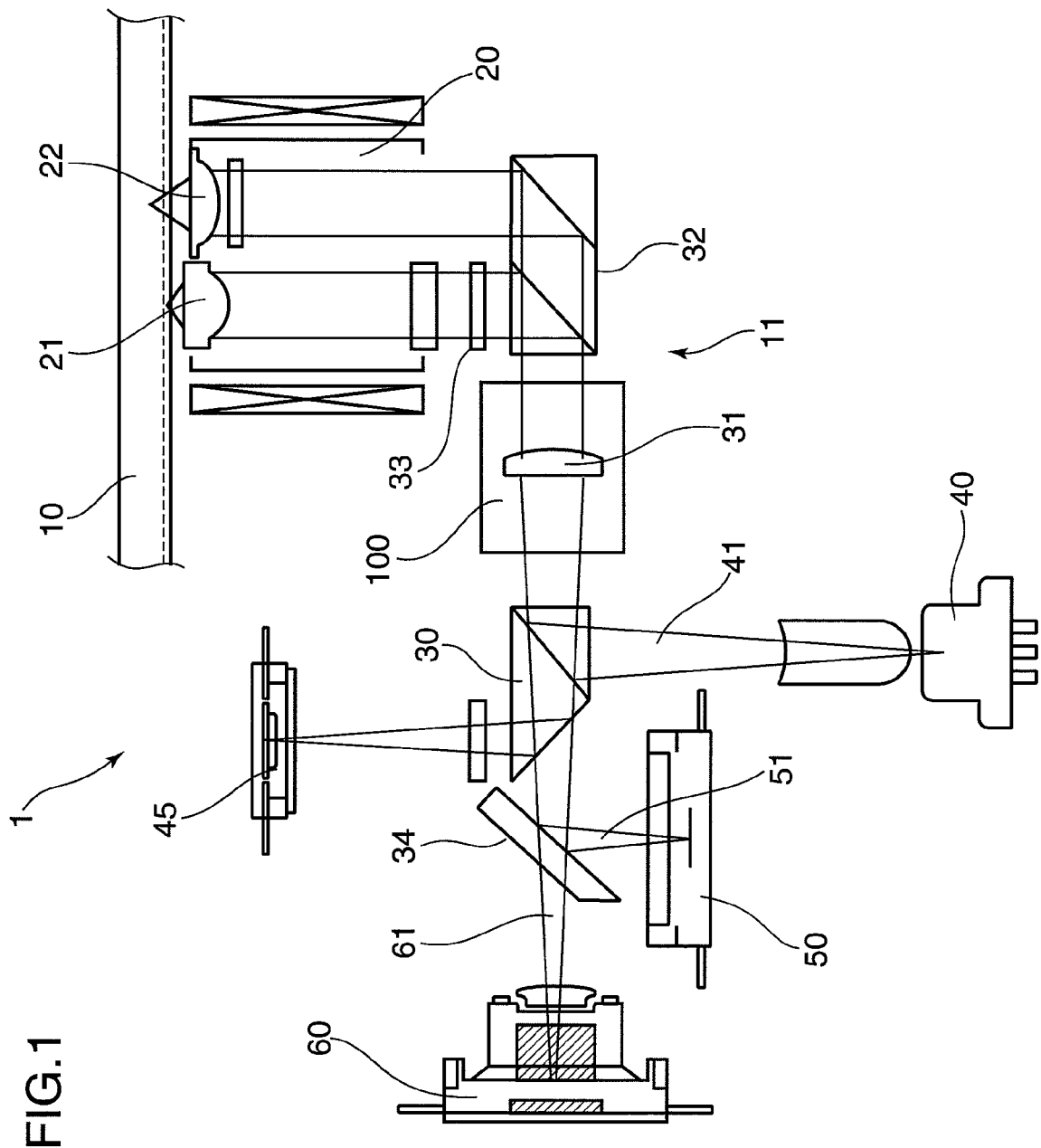
FIG. 1 is a diagram showing an optical arrangement of an optical pickup device in accordance with a first embodiment of the invention.

In the following, embodiments of the invention are described referring to the drawings. The following embodiments are merely examples embodying the invention, and do not limit the technical scope of the invention.

First Embodiment

In this section, the first embodiment of the invention is described in detail referring to the drawings. First, an arrangement of the optical pickup device 1 in accordance with the first embodiment of the invention is described referring to FIGS. 1 and 2.

Figure 2:
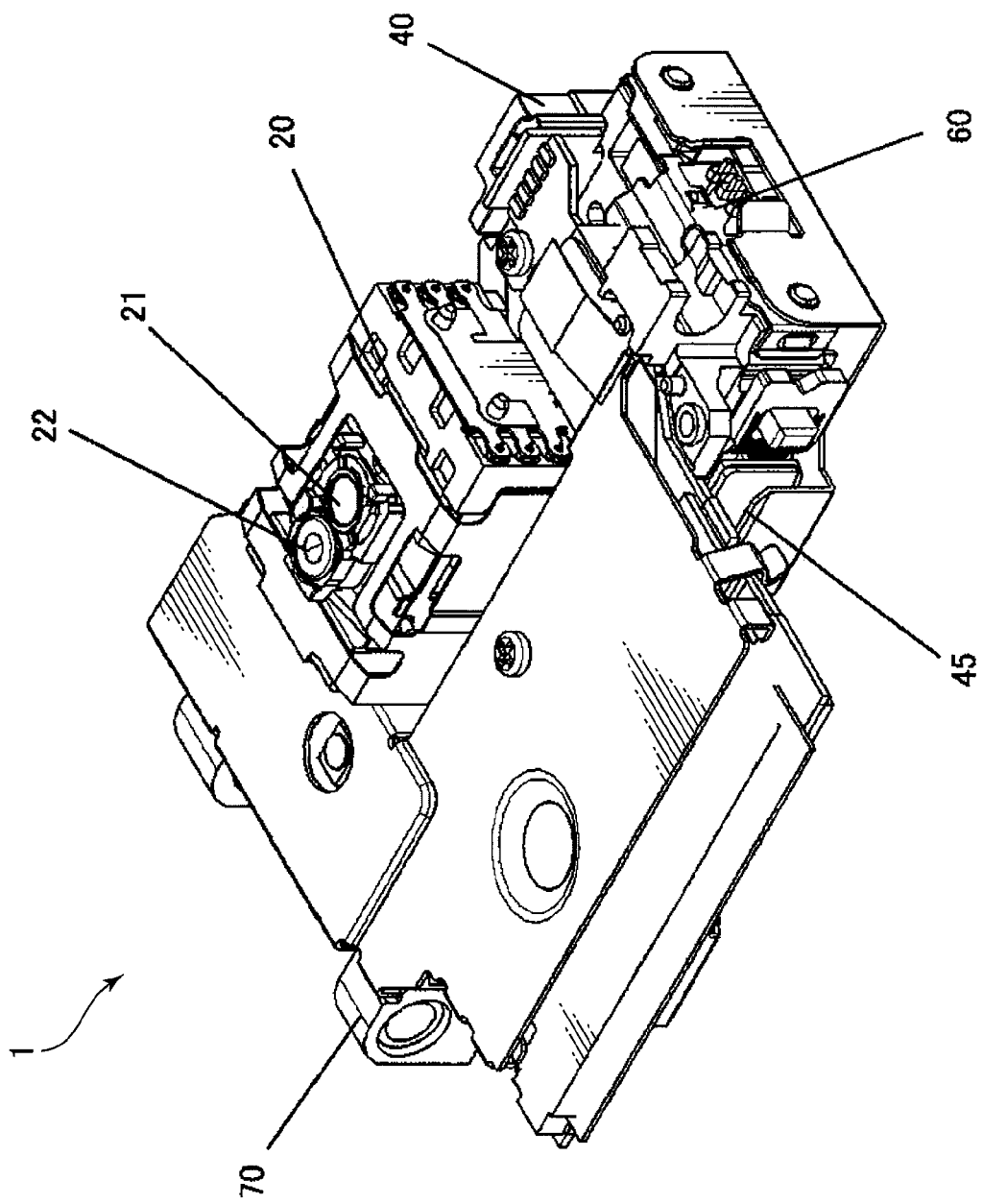
FIG. 2 is a perspective view showing the external appearance of the optical pickup device in accordance with the first embodiment of the invention.

FIG. 1 is a diagram showing an optical arrangement of the optical pickup device 1 in accordance with the first embodiment of the invention. FIG. 2 is a perspective view showing the external appearance of the optical pickup device 1 in accordance with the first embodiment of the invention The optical pickup device 1 includes an objective lens actuator 20, a first objective lens 21, a second objective lens 22, a beam splitter 30, a collimator lens 31, a mirror 32, a quarter wavelength plate 33, a wedge beam splitter 34, a blue laser 40, a photodetector 45, a red laser unit 50, an infrared laser unit 60, and a spherical aberration correcting mechanism 100.

The optical pickup device 1 is operable to record or reproduce information by condensing a light flux to be emitted from a light source (the blue laser 40, the red laser unit 50, and the infrared laser unit 60) toward an optical disc 10 by a condensing optical system 11. The condensing optical system 11 is constituted of the first objective lens 21, the second objective lens 22, the beam splitter 30, the collimator lens 31, the mirror 32, the quarter wavelength plate 33, and the wedge beam splitter 34.

As shown in FIGS. 1 and 2, the optical pickup device 1 of the embodiment is loaded with three kinds of laser light sources for emitting blue light of 405 nm wavelength, red light of 650 nm wavelength, and infrared light of 780 nm wavelength to record and/or reproduce information with respect to optical discs 10 of three kinds i.e. optical discs of 0.1 mm, 0.6 mm, and 1.2 mm in substrate thickness, respectively. The first objective lens 21 mounted on the objective lens actuator 20 is compatible solely with blue light, and is designed to focus on an information recording surface of the optical disc 10 of 0.1 mm in substrate thickness. The second objective lens 22 mounted on the objective lens actuator 20 is compatible with light beams of two wavelengths i.e. red light and infrared light, and is compatibly designed to focus on information recording surfaces of the optical discs 10 of 0.6 mm and 1.2 mm in substrate thickness.

An example of the optical disc 10 on which blue light is irradiated is BD, an example of the optical disc 10 on which red light is irradiated is DVD, and an example of the optical disc 10 on which infrared light is irradiated is CD.

First, an operation of condensing a blue light beam on the optical disc 10, and an operation of detecting reflection light from the optical disc 10 are described.

A blue light beam 41 emitted from the blue laser 40 as a blue light source is reflected on the beam splitter 30, and then reaches on the collimator lens 31 mounted in the spherical aberration correcting mechanism 100. The blue light beam 41 reflected on the beam splitter 30 is linearly polarized light, and is converted into substantially parallel light by the collimator lens 31. The collimator lens 31 is operable to convert the blue light beam 41 into substantially parallel light. An optical axis of the blue light beam 41 is bent in a substantially right angular direction with respect to the optical disc 10 by a surface of the mirror 32. Then, the blue light beam 41 is converted into circularly polarized light while transmitting through the quarter wavelength plate 33. Thereafter, the first objective lens 21 is operable to converge the blue light beam 41 into a light spot on the information recording surface of the optical disc 10. In this embodiment, the first objective lens 21 is operable to condense the blue light beam 41 with the numerical aperture of e.g. 0.85.

The blue light beam 41 reflected on the information recording surface of the optical disc 10 is incident onto the first objective lens 21, and then reaches on the quarter wavelength plate 33. The blue light beam 41 is converted into linearly polarized light in a direction perpendicularly intersecting with the linearly polarized light of the blue light beam 41 on the outward path (i.e. linearly polarized light of the blue light beam 41 to be emitted from the collimator lens 31 to the mirror 32) by the quarter wavelength plate 33. Thereafter, the blue light beam 41 is bent on the surface of the mirror 32, transmitted through the collimator lens 31, and incident onto the beam splitter 30. In incidence onto the beam splitter 30, the blue light beam 41 is reflected on the beam splitter 30 and incident onto the photodetector 45. The blue light beam 41 incident onto the photodetector 45 is subjected to photoelectrical conversion by the photodetector 45. The photodetector 45 is operable to output an electrical signal for obtaining an information signal and a servo signal (a focus error signal for focus control and a tracking signal for tracking control).

Next, an operation of condensing a red light beam on the optical disc 10, and an operation of detecting reflection light from the optical disc 10 are described.

A red laser as a red light source is incorporated in the red laser unit 50. A red light beam 51 emitted from the red laser unit 50 is reflected on the wedge beam splitter 34, and then converted into substantially parallel light by the collimator lens 31 and guided to the mirror 32. The collimator lens 31 is operable to convert the red light beam 51 into substantially parallel light. The mirror 32 is operable to bend an optical axis of the red light beam 51 in a substantially right angular direction with respect to the optical disc 10 by a surface of the mirror 32 other than the surface where the blue light beam 41 emitted from the blue laser 40 is reflected. The second objective lens 22 is operable to converge the red light beam 51 into a light spot on the information recording surface of the optical disc 10. In this embodiment, the second objective lens 22 is operable to condense the red light beam 51 with a numerical aperture of e.g. 0.6.

The red light beam 51 reflected on the information recording surface of the optical disc 10 is guided along the optical path in the direction opposite to the incoming direction of the red light beam 51, reflected on the wedge beam splitter 34, and incident onto a photodetector incorporated in the red laser unit 50. The red light beam 51 incident into the red laser unit 50 is subjected to photoelectrical conversion by the photodetector in the red laser unit 50. The photodetector is operable to output an electrical signal for obtaining an information signal and a servo signal (a focus error signal for focus control and a tracking signal for tracking control). In this embodiment, since an integrated unit constituted of a light source and a photodetector is used as the red laser unit 50, the optical pickup device 1 can be miniaturized, with the thickness thereof being reduced, while securing stability.

Next, an operation of condensing an infrared light beam on the optical disc 10, and an operation of detecting reflection light from the optical disc 10 are described.

An infrared laser as an infrared light source is incorporated in the infrared laser unit 60. An infrared light beam 61 emitted from the infrared laser unit 60 is transmitted through the wedge beam splitter 34, converted into substantially parallel light by the collimator lens 31, and guided to the mirror 32. The collimator lens 31 is operable to convert the infrared light beam 61 into substantially parallel light. The mirror 32 is operable to bend an optical axis of the infrared light beam 61 in a substantially right angular direction with respect to the optical disc 10 by a surface of the mirror 32 other than the surface where the blue light beam 41 emitted from the blue laser 40 is reflected. The second objective lens 22 is operable to converge the infrared light beam 61 into a light spot on the information recording surface of the optical disc 10. In this embodiment, the second objective lens 22 is operable to condense the infrared light beam 61 with a numerical aperture of e.g. 0.45.

The infrared light beam 61 reflected on the information recording surface of the optical disc 10 is guided along the optical path in the direction opposite to the incoming direction of the infrared light beam 61, transmitted through the wedge beam splitter 34, and incident onto a photodetector incorporated in the infrared laser unit 60. The infrared light beam 61 incident into the infrared laser unit 60 is subjected to photoelectrical conversion by the photodetector in the infrared laser unit 60. The photodetector is operable to output an electrical signal for obtaining an information signal and a servo signal (a focus error signal for focus control and a tracking signal for tracking control). In this embodiment, since an integrated unit constituted of a light source and a photodetector is used as the infrared laser unit 60, the optical pickup device 1 can be miniaturized, with the thickness thereof being reduced, while securing stability.

The optical system having the above arrangement is mounted on an optical base 70, and assembled into the optical pickup device 1 as shown in FIG. 2.

Figure 3:
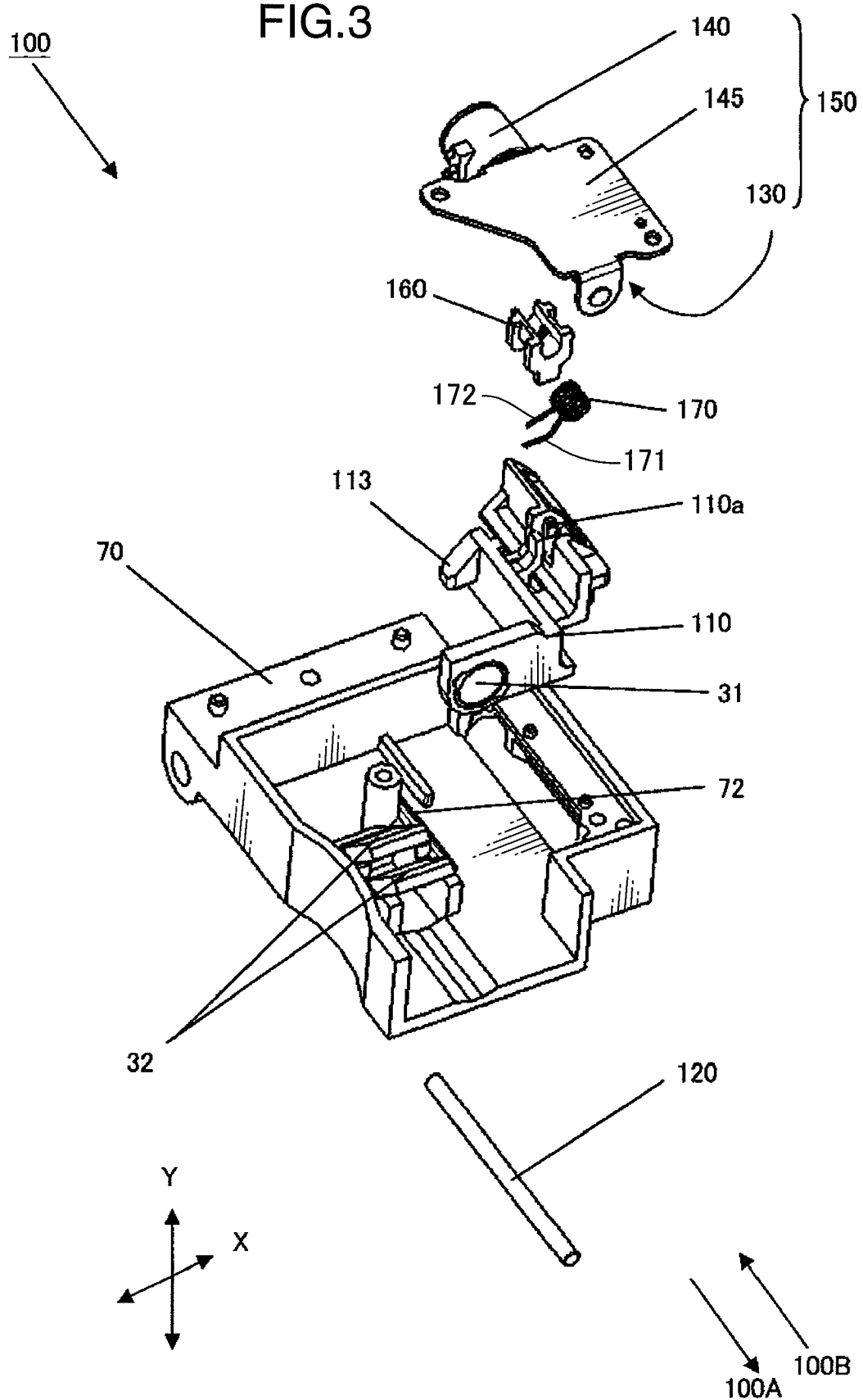
FIG. 3 is an exploded perspective view showing an arrangement of a spherical aberration correcting mechanism to be loaded in the optical pickup device in accordance with the first embodiment of the invention.
Figure 4:
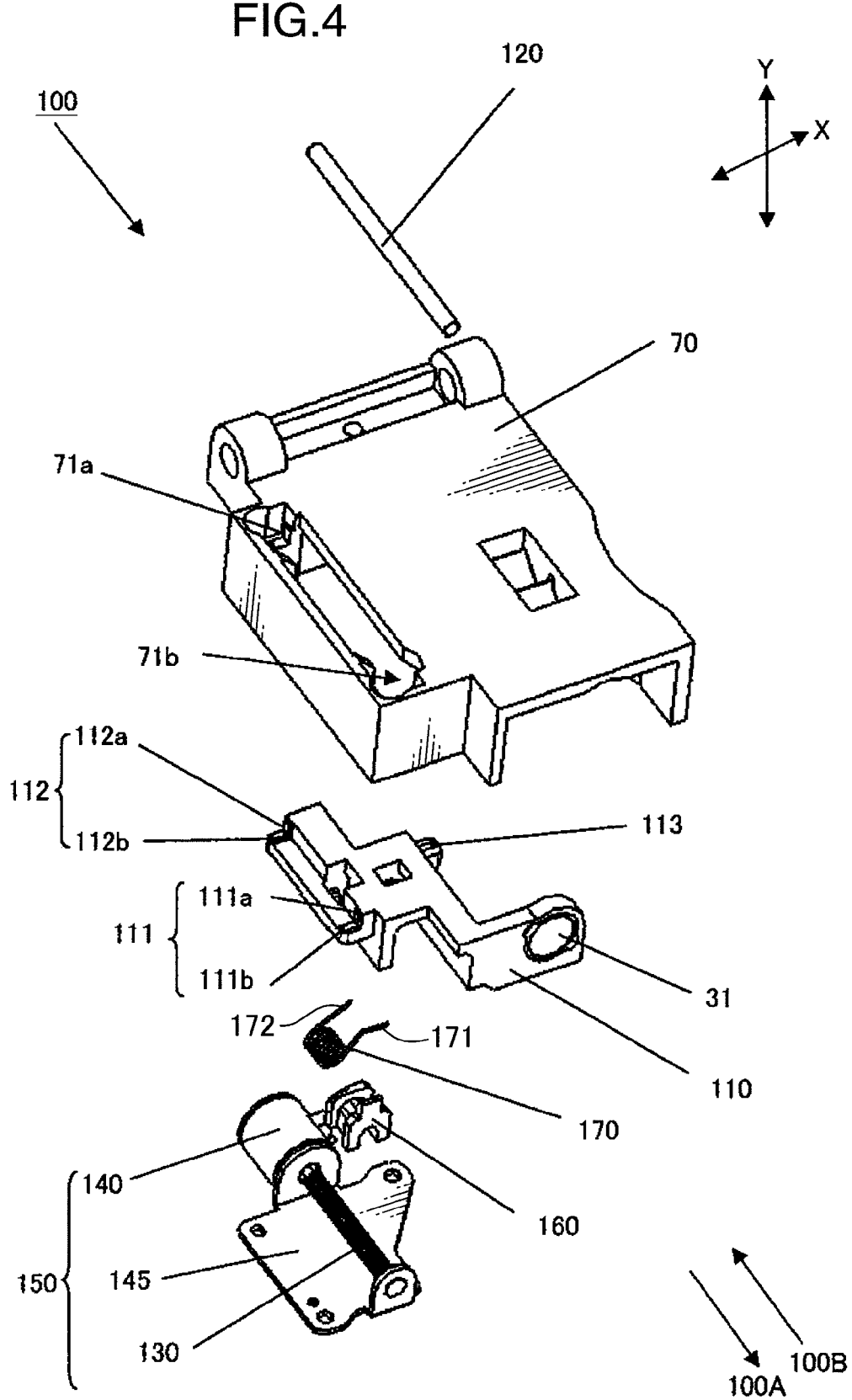
FIG. 4 is an exploded perspective view of the spherical aberration correcting mechanism shown in FIG. 3, viewed from the backside thereof.
Figure 5:
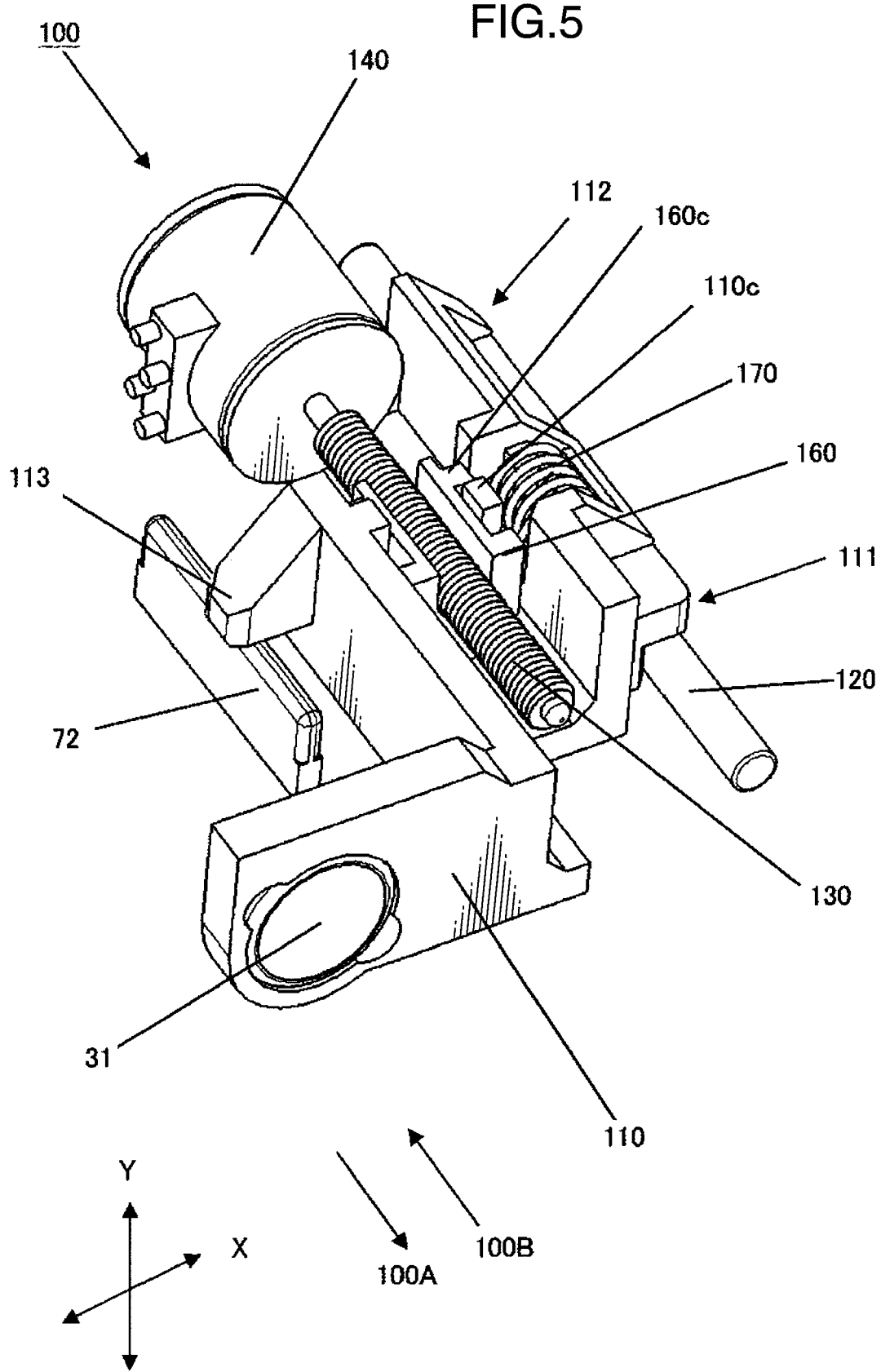
FIG. 5 is a perspective view showing the external appearance of the spherical aberration correcting mechanism to be loaded in the optical pickup device in accordance with the first embodiment of the invention.

Next, an arrangement of the spherical aberration correcting mechanism 100 in this embodiment is described referring to FIGS. 3 through 5.

FIG. 3 is an exploded perspective view showing an arrangement of the spherical aberration correcting mechanism 100 to be loaded in the optical pickup device 1 in accordance with the first embodiment of the invention. FIG. 4 is an exploded perspective view of the spherical aberration correcting mechanism 100 shown in FIG. 3, viewed from the backside thereof. FIG. 5 is a perspective view showing the external appearance of the spherical aberration correcting mechanism 100 to be loaded in the optical pickup device 1 in accordance with the first embodiment of the invention.

The spherical aberration correcting mechanism 100 to be loaded in the optical pickup device 1 is operable to correct a spherical aberration resulting from a thickness variation of a cover layer of the optical disc 10, or switching the position of a light spot between recording layers, by driving the collimator lens 31 in the optical axis direction (the arrow direction 100A and the arrow direction 100B), and adjusting the position of the collimator lens 31.

As shown in FIGS. 3 and 4, the spherical aberration correcting mechanism 100 includes the collimator lens 31, the lens holder 110 for holding the collimator lens 31, a guide shaft 120 and a guide portion 72 for movably guiding the lens holder 110 in the optical axis direction (the arrow direction 100A and the arrow direction 100B) while supporting the lens holder 110, a screw shaft 130 arranged in parallel to the optical axis direction and formed with a helical groove, a stepping motor 140 with a rotating shaft to be directly connected to the screw shaft 130 and operable to rotate the screw shaft 130, a motor frame 145 for holding the screw shaft 130 and the stepping motor 140, a nut member 160 in engagement with the helical groove of the screw shaft 130 and operable to convert a rotating movement of the screw shaft 130 into a rectilinear movement of the lens holder in the optical axis direction, an urging spring 170 held on the lens holder 110 and operable to urge the lens holder 110 against the guide shaft 120 and the guide portion 72 by engagement with the nut member 160, and the optical base 70 for supporting the guide shaft 120 and the guide portion 72.

In this embodiment, the collimator lens 31 corresponds to an example of a correction lens, the lens holder 110 corresponds to an example of a lens holder, the guide shaft 120 corresponds to an example of a main guide member, the guide portion 72 corresponds to an example of an auxiliary guide member, the screw shaft 130 corresponds to an example of a feed screw, the stepping motor 140 corresponds to an example of a feed motor, the nut member 160 corresponds to an example of a nut member, the urging spring 170 corresponds to an example of an urging member, and the optical base 70 corresponds to an example of an optical base.

A motor unit 150 is constituted of the screw shaft 130, the stepping motor 140, and the motor frame 145. An end of the motor frame 145 supports a lead end of the screw shaft 130 via a bearing, and the other end of the motor frame 145 supports the stepping motor 140 with a rotating shaft to be directly connected to the screw shaft 130. The motor unit 150 is mounted on the optical base 70 in such a manner that the screw shaft 130 extends substantially in parallel to the guide shaft 120.

Bearings 71a and 71b for supporting the guide shaft 120 are formed on the optical base 70. The optical base 70 has the guide portion 72 extending substantially in parallel to the guide shaft 120. The guide portion 72 is contacted with the lens holder 110 to restrain rotation of the lens holder 110 about an axis of the guide shaft 120, and movably supports the lens holder 110 in the optical axis direction (the arrow direction 100A and the arrow direction 100B).

The guide portion 72 is constituted of a part of the optical base 70. In other words, the guide portion 72 is integrally formed with the optical base 70. Thus, the guide portion 72 is formed in molding the optical base 70, which is advantageous in easily forming the guide portion 72.

The lens holder 110 includes a first contact portion 111 to be contacted with the guide shaft 120 at a first position, a second contact portion 112 to be contacted with the guide portion 120 at a second position different from the first position, and a third contact portion 113 to be contacted with the guide portion 72 of the optical base 70.

The lens holder 110 is driven in the optical axis direction along the guide shaft 120 by the stepping motor 140, with the first contact portion 111 and the second contact portion 112 being contacted with the guide shaft 120, and the third contact portion 113 being contacted with the guide portion 72 by an urging force of the urging spring 170.

Each of the first contact portion 111 and the second contact portion 112 to be contacted with the guide shaft 120 has two contact surfaces. The first contact portion 111 has a first X-direction contact surface 111a for restraining movement of the lens holder 110 in a first restraining direction (X direction) in parallel to the optical disc on a plane perpendicular to the optical axis direction; and a first Y-direction contact surface 111b for restraining movement of the lens holder 110 in a second restraining direction (Y direction) substantially perpendicular to the first restraining direction on the plane perpendicular to the optical axis direction. Likewise, the second contact portion 112 has a second X-direction contact surface 112a for restraining movement of the lens holder 110 in the first restraining direction in parallel to the optical disc on the plane perpendicular to the optical axis direction; and a second Y-direction contact surface 112b for restraining movement of the lens holder 110 in the second restraining direction substantially perpendicular to the first restraining direction on the plane perpendicular to the optical axis direction. In this embodiment, X direction and Y direction perpendicularly intersect with each other.

In this embodiment, the first X direction contact surface 111a and the second X direction contact surface 112a correspond to an example of a first contact surface, and the first Y direction contact surface 111b and the second Y direction contact surface 112b correspond to an example of a second contact surface.

The urging spring 170 is constituted of a torsion coil spring. Specifically, a coil portion constituted of a wound wire member is held in a holding portion 110a of the lens holder 110. One end 171 of the wire member extending from the coil portion of the urging spring 170 is engaged with a nut member engaging portion 160a (see FIG. 7) formed in the nut member 160, and the other end 172 thereof is engaged with a lens holder engaging portion 110b (see FIG. 6) formed in the lens holder 110. In this arrangement, mounting the motor unit 150 on the optical base 70 urges the nut member 160 against the screw shaft 130 at the one end 171 of the urging spring 170. Thereby, a reaction force of the urging spring 170 is exerted on the other end 172 of the urging spring 170 engaged with the lens holder engaging portion 110b. Thus, the lens holder 110 is urged against the guide shaft 120 and the guide portion 72.

The urging spring 170 is operable to contact the nut member 160 with the lens holder 110 by urging the nut member 160 in the optical axis direction. The urging spring 170 is operable to urge the nut member 160 in the arrow direction 100A by utilizing a flexure of the urging spring 170 in the arrow direction 100B. As shown in FIG. 5, the urging force brings a nut holding surface 110c of the lens holder 110 into contact with a contact surface 160c of the nut member 160. Thereby, the lens holder 110 and the nut member 160 are integrally movable in the arrow direction 100A and the arrow direction 100B.

An arrangement for urging the lens holder 110 against the guide shaft 120 and the guide portion 72 by the urging spring 170, and an arrangement for urging the nut member 160 against the lens holder 110 by the urging spring 170 are described later in detail.

In this embodiment, as shown in FIGS. 3 and 4, the guide shaft 120 and the motor unit 150 are mounted on the optical base 70 by screws (not shown). This is advantageous in eliminating use of a UV cured resin adhesive agent, which is generally used in assembling a spherical aberration correcting mechanism. Further, in assembling the spherical aberration correcting mechanism, there is no need of assembling the lens holder 110 and the guide shaft 120 by shaft engagement, unlike the conventional guide arrangement using shaft engagement. Specifically, the lens holder 110 is mounted on the guide shaft 120 and the guide portion 72, and the urging spring 170 and the nut member 160 are mounted on the lens holder 110. Thereafter, the motor unit 150 is mounted. Thereby, the lens holder 110 is urged against the guide shaft 120 and the guide portion 72 via the nut member 160. This is advantageous in significantly reducing the number of assembling steps.

In the spherical aberration correcting mechanism 100 having the above arrangement, the lens holder 110 is urged against the guide shaft 120 and the guide portion 72 of the optical base 70 by the urging force of the urging spring 170, and the nut member 160 is integrally moved with the lens holder 110 in the optical axis direction (the arrow direction 100A and the arrow direction 100B). In this arrangement, the lens holder 110 is moved to an intended position along the guide shaft 120 and the guide portion 72 of the optical base 70 in the optical axis direction (the arrow direction 100A and the arrow direction 100B) without play or backlash by rotatably driving the stepping motor 140.

As described above, a spherical aberration can be corrected by rotatably driving the stepping motor 140 depending on a spherical aberration amount resulting from a thickness variation of a cover layer, or switching the position of a light spot between recording layers; and changing the position of the collimator lens 31.

Next, the arrangement of the urging spring 170 in the spherical aberration correcting mechanism 100 having the above arrangement is described referring to FIGS. 6 through 9.

Figure 8:
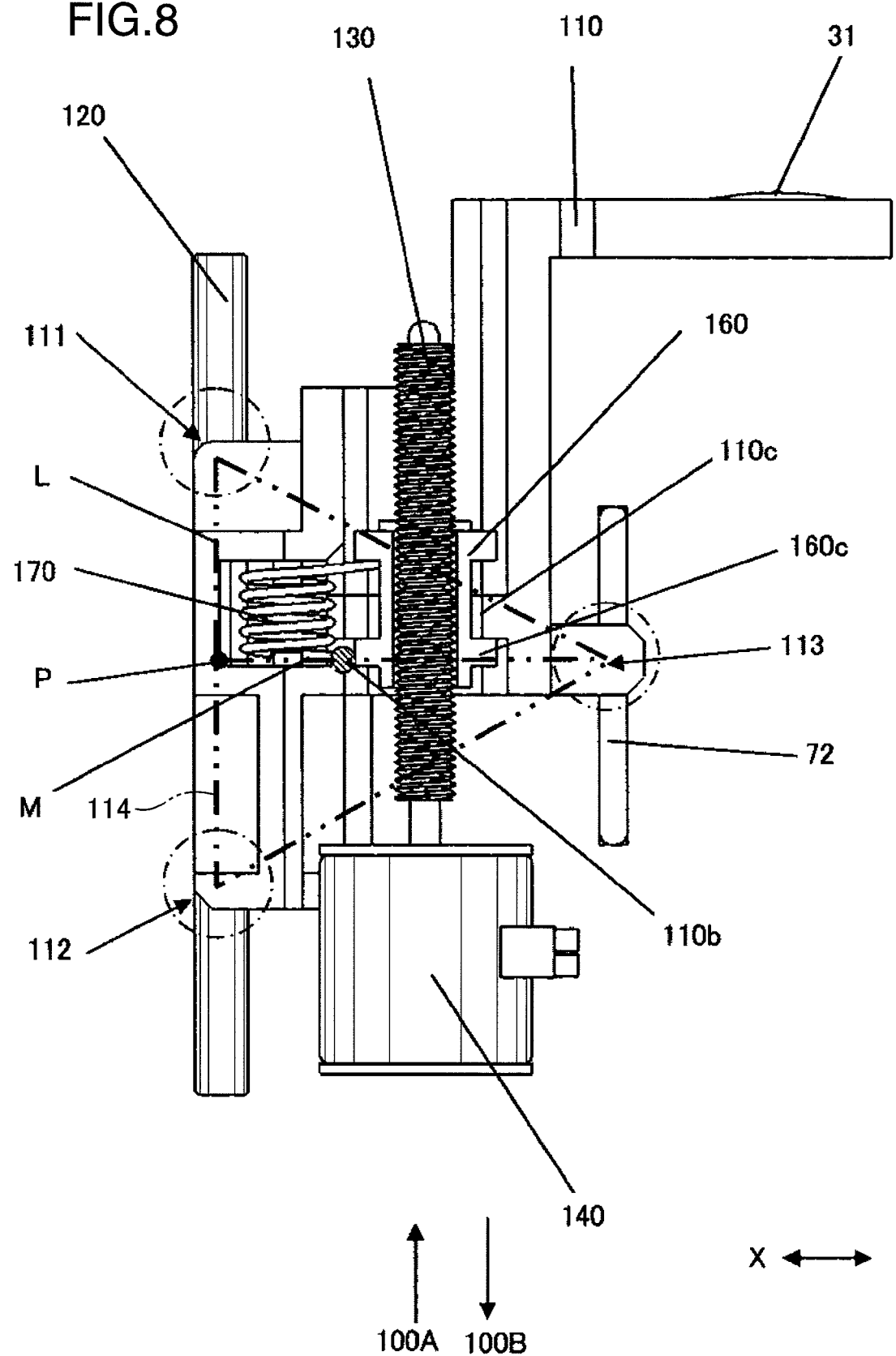
FIG. 8 is a plan view of the spherical aberration correcting mechanism in the first embodiment of the invention.
Figure 9:
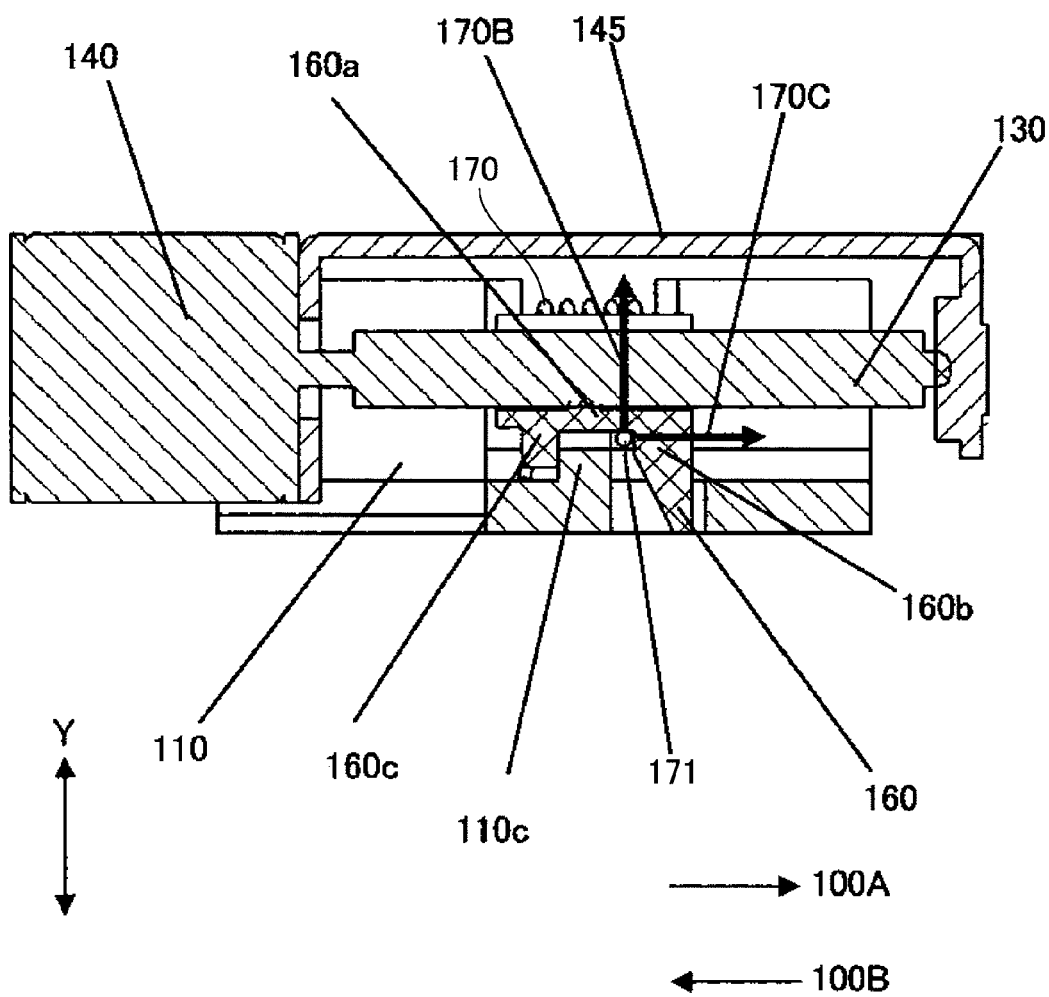
FIG. 9 is a sectional view taken along a plane in parallel to the optical axis direction of the spherical aberration correcting mechanism in the first embodiment of the invention.

FIG. 6 is a sectional view taken along a plane perpendicular to the optical axis direction (the arrow direction 100A and the arrow direction 100B) of the spherical aberration correcting mechanism 100 in the first embodiment of the invention, showing an engagement relation between the lens holder 110 and the urging spring 170. FIG. 7 is a sectional view taken along the plane perpendicular to the optical axis direction (the arrow direction 100A and the arrow direction 100B) of the spherical aberration correcting mechanism 100 in the first embodiment of the invention, showing an engagement relation between the nut member 160 and the urging spring 170. FIG. 8 is a plan view of the spherical aberration correcting mechanism 100 in the first embodiment of the invention. FIG. 9 is a sectional view taken along a plane in parallel to the optical axis direction (the arrow direction 100A and the arrow direction 100B) of the spherical aberration correcting mechanism 100 in the first embodiment of the invention.

First, the arrangement for urging the lens holder 110 against the guide shaft 120 and the guide portion 72 of the optical base 70 by the urging spring 170 is described referring to FIGS. 6 through 8.

As described above, the motor unit 150 is mounted on the optical base 70 to fix the position of the screw shaft 130. In this arrangement, as shown in FIGS. 6 and 7, the urging spring 170 is held on the holding portion 110a of the lens holder 110, and the both ends 172 and 171 of the urging spring 170 are respectively engaged with the lens holder engaging portion 110b and the nut member engaging portion 160a. The urging spring 170 is operable to urge the lens holder 110 in the arrow direction 170A at the lens holder engaging portion 110b, and urge the nut member 160 in the arrow direction 170B at the nut member engaging portion 160a.

As shown in FIG. 6, the direction of urging force to be exerted on the lens holder engaging portion 110b is aligned with the arrow direction 170A, and has a predetermined angle with respect to X direction and Y direction. The direction of urging force is not in parallel to X direction and Y direction. Accordingly, the urging force to be exerted on the lens holder engaging portion 110b has two urging force components, i.e., one urging force component in the arrow direction 170X in parallel to X direction, and the other urging force component in the arrow direction 170Y in parallel to Y direction.

In the above arrangement, the first X direction contact surface 111a and the second X direction contact surface 112a of the lens holder 110 are urgingly contacted with the guide shaft 120 by the urging force component in the arrow direction 170X of the urging spring 170. Likewise, the first Y direction contact surface 111b and the second Y direction contact surface 112b of the lens holder 110 are urgingly contacted with the guide shaft 120 by the urging force component in the arrow direction 170Y of the urging spring 170.

Since the lens holder engaging portion 110b is formed between the first contact portion 111 and the second contact portion 112, and the third contact portion 113, the third contact portion 113 of the lens holder 110 is urgingly contacted with the guide portion 72 of the optical base 70 by the urging force component of the urging spring 170 in the arrow direction 170Y. Thereby, rotation of the lens holder 110 about the axis of the guide shaft 120 is restrained.

By the contact relations between the lens holder 110, and the guide shaft 120 and the guide portion 72 at the above five positions, the lens holder 110 is movably urged along the guide shaft 120 in the arrow direction 100A and the arrow direction 100B.

In this embodiment, an urging force is exerted on the aforementioned five contact surfaces (contact portions) by a single urging force to be exerted on the lens holder engaging portion 110b in the arrow direction 170A. In view of this, the lens holder engaging portion 110b is formed near the centroid of a triangle 114 to be defined by the first contact portion 111, the second contact portion 112, and the third contact portion 113. In particular, it is necessary to exert an urging force substantially equally on the first contact portion 111 and the second contact portion 112 in order to move the lens holder 110 in the optical axis direction (the arrow direction 100A and the arrow direction 100B) along the guide shaft 120 serving as a main guide member. In view of this, in this embodiment, as shown in FIG. 8, the lens holder engaging portion 110b is formed at such a position that a line segment "L" connecting the first contact portion 111 and the second contact portion 112 and in parallel to the optical axis direction perpendicularly intersects with a line segment "M" connecting a midpoint "P" of the line segment "L" and the lens holder engaging portion 110b. Arranging the lens holder engaging portion 110b at the aforementioned position enables to exert the urging force in the arrow direction 170X substantially equally on the first X direction contact surface 111a and the second X direction contact surface 112a.

Thus, the lens holder engaging portion 110b is formed on a plane including the midpoint "P" or its vicinity on the line segment "L" connecting the first contact portion 111 and the second contact portion 112 and in parallel to the optical axis direction, the plane being in parallel to the first restraining direction (X direction).

Further, forming the third contact portion 113 on the extension of the line segment "M" enables to exert the urging force in the arrow direction 170Y substantially equally on the first Y direction contact surface 111b and the second Y direction contact surface 112b. As described above, since the lens holder engaging portion 110b is formed between the first contact portion 111 and the second contact portion 112, and the third contact portion 113, an urging force to be exerted on the guide portion 72 is also exerted on the lens holder engaging portion 110b. Further, forming the lens holder engaging portion 110b the centroid or its vicinity of the triangle 114 to be defined by the first contact portion 111, the second contact portion 112, and the third contact portion 113 enables to exert an urging force substantially equally on three positions i.e. the first Y direction contact surface 111b, the second Y direction contact surface 112b, and the third contact portion 113.

In view of the above, forming the first contact portion 111, the second contact portion 112, and the third contact portion 113 of the lens holder 110 at such positions that the triangle 114 to be defined by the first contact portion 111, the second contact portion 112, and the third contact portion 113 becomes an isosceles triangle with the line segment "L" being a base; and forming the lens holder engaging portion 110b near the centroid of the triangle 114 enables to stably urge the lens holder 110 against the guide shaft 120 as a main guide member.

As shown in FIG. 7, the urging force in the arrow direction 170B is exerted on the nut member engaging portion 160a by the other end 172 of the urging spring 170. Thereby, the nut member 160 is pressed against the screw shaft 130. This enables to eliminate play or backlash between the helical groove of the screw shaft 130 and the nut member 160, and precisely drive the nut member 160 in the arrow direction 100A and the arrow direction 100B by rotatably driving the stepping motor 140.

As shown in FIGS. 6 and 7, the nut member 160 is engaged with the screw shaft 130 with a certain clearance from the lens holder 110 in X direction and Y direction. Accordingly, even if the degree of parallelism between the guide shaft 120 and the screw shaft 130 is varied, the lens holder 110 is movable along the guide shaft 120 while being urged by the guide shaft 120 by the urging force of the urging spring 170, without being subjected to inclination of the nut member 160.

Next, the arrangement for urging the nut member 160 against the lens holder 110 by the urging spring 170 is described referring to FIG. 9.

The urging spring 170 is constituted of a torsion coil spring. Accordingly, an urging force is generated by flexing an arm portion of the urging spring 170 in the axis direction of a coil portion of the torsion coil spring. For instance, in the case where the arm portion is long, an urging force is generated by flexing the arm portion. On the other hand, in the case where the arm portion is short, an urging force is generated by deforming the coil portion. As shown in FIG. 9, by utilizing the property of the torsion coil spring, the one end 171 of the urging spring 170 is flexed in the arrow direction 100B by a thrust direction engaging portion 160b of the nut member 160, and the urging force in the arrow direction 170C is exerted on the nut member 160. The urging force in the arrow direction 170C brings the nut holding surface 110c of the lens holder 110 into contact with the contact surface 160c of the nut member 160. Thereby, the lens holder 110 and the nut member 160 are integrally movable in the arrow direction 100A and the arrow direction 100B.

In the above arrangement, in the case where the nut member 160 is moved in the arrow direction 100A by rotation of the stepping motor 140, contact of the nut holding surface 110c of the lens holder 110 with the contact surface 160c of the nut member 160 integrally moves the lens holder 110 and the nut member 160. On the other hand, in the case where the nut member 160 is moved in the arrow direction 100B, a driving force of the nut member 160 is transmitted to the lens holder 110 via the urging spring 170. In this case, since the nut holding surface 110c of the lens holder 110 is contacted with the contact surface 160c of the nut member 160, as far as a driving load in the arrow direction 100B is smaller than the urging force in the arrow direction 170C, the lens holder 110 and the nut member 160 are integrally moved without being isolated from each other.

In other words, the lens holder 110 and the nut member 160 are contacted with each other without play by the urging force of the urging spring 170 in the arrow direction 170C. Accordingly, the lens holder 110 and the nut member 160 can be integrally driven in either one of the arrow direction 100A and the arrow direction 100B.

As described above, the spherical aberration correcting mechanism 100 to be loaded in the optical pickup device 1 in accordance with the first embodiment of the invention is advantageous in precisely driving the lens holder 110 along the guide shaft 120 by urging the lens holder 110 against the guide shaft 120 by the contact surfaces in two directions without play by shaft engagement, unlike the conventional arrangement. Accordingly, the lens holder 110 can be smoothly fed along the guide shaft 120, and control of the spherical aberration correcting mechanism 100 can be stabilized while suppressing shake of the collimator lens 31 in driving the lens holder 110.

Further, forming the lens holder engaging portion 110b as an urging point of the lens holder 110 near the centroid of the triangle 114 to be defined by the first contact portion 111, the second contact portion 112, and the third contact portion 113 of the lens holder 110 to be contacted with the guide shaft 120 and the guide portion 72 enables to stably urge the lens holder 110 against the guide shaft 120 as a main guide member. Thereby, the collimator lens 31 can be precisely driven along the guide shaft 120.

Furthermore, the lens holder 110 is urged in the first restraining direction (X direction), and the second restraining direction (Y direction) by the single urging spring 170. Urging the lens holder 110 in three different directions by the single urging spring 170 is advantageous in reducing the number of parts. Also, mounting the guide shaft 120 and the motor unit 150 on the optical base 70 using screws is advantageous in eliminating use of a UV cured resin adhesive agent, which is generally used in assembling the spherical aberration correcting mechanism.

Furthermore, in this embodiment, the lens holder 110 is movably guided in the optical axis direction of the collimator lens 31 by contacting the lens holder 110 against the guide shaft 120 and the guide portion 72. Unlike the conventional guiding arrangement using shaft engagement, this arrangement eliminates the need of shaft engagement between the lens holder 110 and the guide shaft 120 in assembling. Accordingly, the spherical aberration correcting mechanism 100 can be assembled by mounting parts one over the other. This enables to perform an assembling operation precisely and easily, thereby improving assembling performance and significantly reducing the number of assembling steps. Thus, the cost of the spherical aberration correcting mechanism 100 can be reduced by the reduced number of parts, and the reduced number of assembling steps.

The main guide member for guiding the lens holder 110 in the optical axis direction is constituted of a shaft with a surface thereof being polished. This is advantageous in improving rectilinear precision and wear resistance in driving the lens holder 110, and securing high reliability.

In this embodiment, a shaft is used as a main guide member for the lens holder 110. Alternatively, for instance, in the case where the optical base 70 is made of a resin, as far as rectilinear precision and wear resistance substantially equivalent or close to those in using a shaft are obtained, the main guide member may be constituted of a part of the optical base 70, and may be integrally formed with the optical base 70.

In this embodiment, the guide portion 72 is formed by projecting a part of the optical base 70 to guide the lens holder 110. Alternatively, for instance, in the case where the optical base 70 is made of a metal, the guide portion 72 may be constituted of a shaft to lower the requirement on surface precision of the guide portion 72 as a sliding portion, or eliminate the need of coating a lubricant.

In this embodiment, the guide shaft 120 is disposed at a position farther away from the optical axis of the collimator lens 31 than the guide portion 72 of the optical base 70. Alternatively, the positional relation between the guide shaft 120 and the guide portion 72 may be reversed.

In this embodiment, the screw shaft 130 is disposed between the guide shaft 120 and the guide portion 72. Alternatively, as far as the lens holder engaging portion 110b is formed near the centroid of the triangle 114 to be defined by the first contact portion 111, the second contact portion 112, and the third contact portion 113 of the lens holder 110, the lens holder 110 can be stably guided without depending on the arrangement relation.

In this embodiment, the X direction contact surface and the Y direction contact surface formed on each of the first contact portion 111 and the second contact portion 112 perpendicularly intersect with each other. Alternatively, an effect substantially the same as the above can be obtained by e.g. setting an angle between the X direction contact surface and the Y direction contact surface formed on each of the first contact portion 111 and the second contact portion 112 to 90 degrees or less.

In this embodiment, the collimator lens 31 for correcting a spherical aberration is an example of a correction lens, and a spherical aberration correcting mechanism for driving the collimator lens 31 is described. Alternatively, the invention may be applicable to e.g. an image correcting mechanism for driving a zoom lens to correct an image. The correction lens is operable to correct an optical characteristic of light to be transmitted through a condensing optical system. The optical pickup device 1 of this embodiment has at least one correction lens to be included in a condensing optical system.

Second Embodiment

In this section, the second embodiment of the invention is described in detail referring to the drawings.

Figure 10:
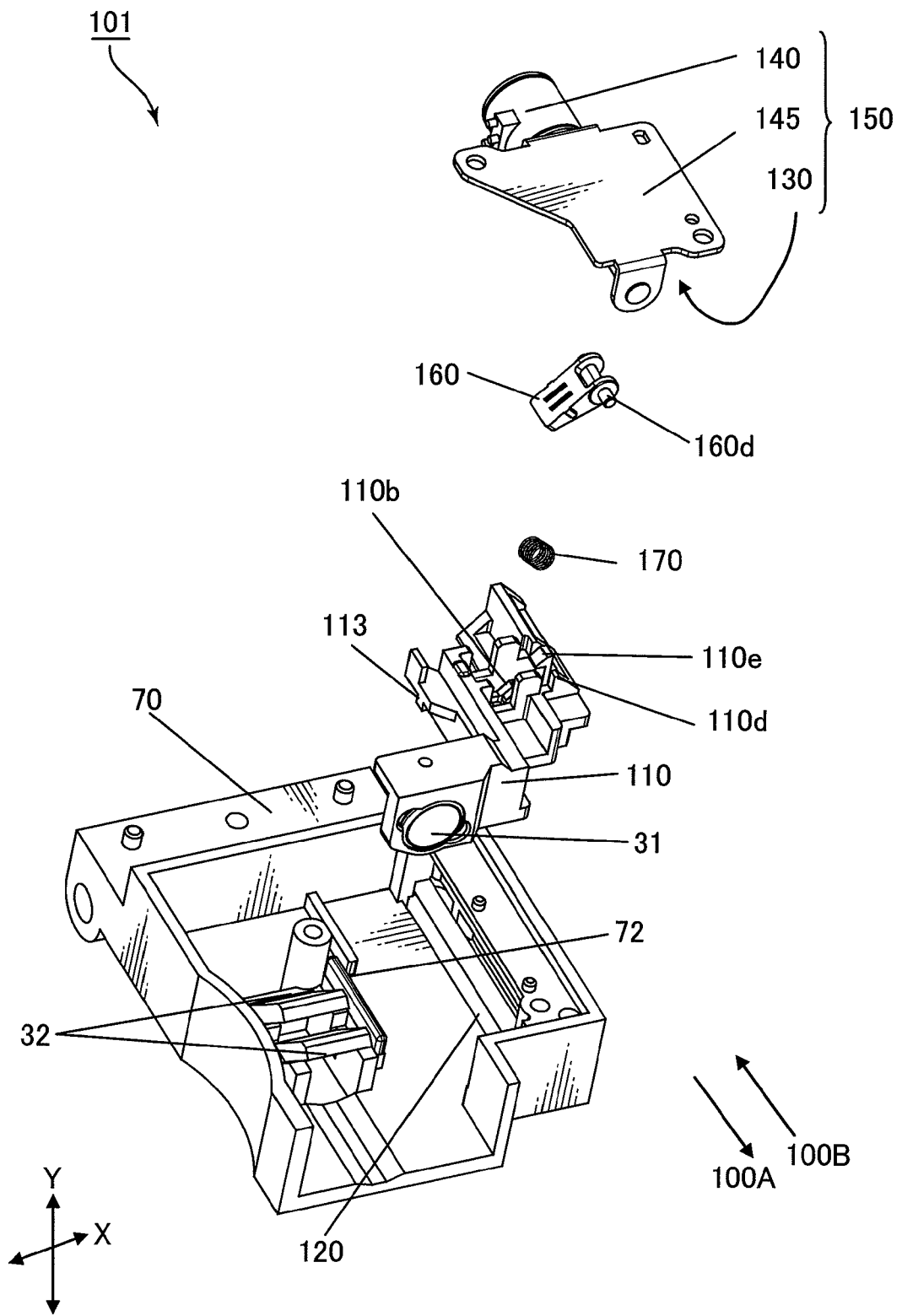
FIG. 10 is an exploded perspective view showing an arrangement of a spherical aberration correcting mechanism to be loaded in an optical pickup device in accordance with a second embodiment of the invention.
Figure 11:
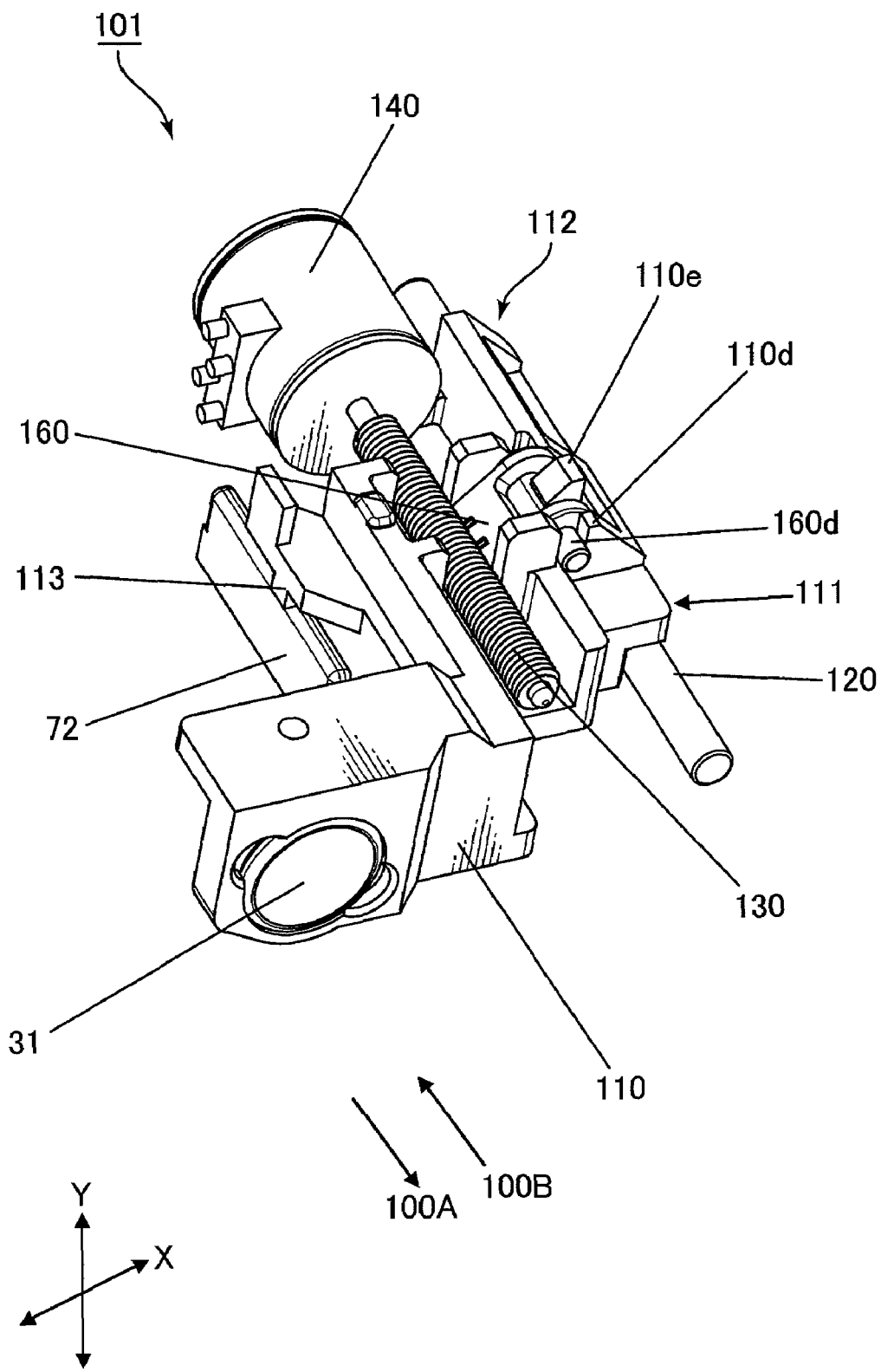
FIG. 11 is a perspective view showing the external appearance of the spherical aberration correcting mechanism to be loaded in the optical pickup device in accordance with the second embodiment of the invention.

FIG. 10 is an exploded perspective view showing an arrangement of a spherical aberration correcting mechanism 101 to be loaded in an optical pickup device 1 in accordance with the second embodiment of the invention. FIG. 11 is a perspective view showing the external appearance of the spherical aberration correcting mechanism 101 to be loaded in the optical pickup device 1 in accordance with the second embodiment of the invention.

As shown in FIGS. 10 and 11, the second embodiment is different from the first embodiment in the arrangement for supporting a nut member 160 and an urging spring 170 in the spherical aberration correcting mechanism 101. The arrangement of the second embodiment other than the supporting arrangement is identical to the corresponding arrangement of the first embodiment. Therefore, in this section, merely the arrangement for supporting the nut member 160 and the urging spring 170 in the spherical aberration correcting mechanism 101 is described, and detailed description on the optical pickup device 1 is omitted. In the second embodiment, elements substantially identical or equivalent to those in the first embodiment are indicated and described with the same reference numerals.

The spherical aberration correcting mechanism 101 in the second embodiment is different from the spherical aberration correcting mechanism 100 in the first embodiment in that the nut member 160 is pivotally supported on a lens holder 110 by engagement of a pivot shaft 160d of the nut member 160 in a bearing portion 110d of the lens holder 110. Because of the change in the arrangement, the arrangement for mounting the urging spring 170 is different from the corresponding arrangement of the first embodiment.

Engaging the pivot shaft 160d of the nut member 160 in the bearing portion 110d of the lens holder 110, and supporting the pivot shaft 160d by a pawl portion 110e of the lens holder 110 pivotally supports the nut member 160 on the lens holder 110. The pivot direction of the nut member 160 is in parallel to a plane perpendicular to an optical axis of the spherical aberration correcting mechanism 101.

The urging spring 170 is constituted of a compression coil spring. One end of the urging spring 170 is held on a holding portion 160e (see FIG. 12) of the nut member 160, and the other end thereof is held on a lens holder engaging portion 110b (see FIG. 12) of the lens holder 110. In this arrangement, mounting a motor unit 150 on an optical base 70 pivotally moves the nut member 160 about an axis of the pivot shaft 160d, and the nut member 160 is urged against a screw shaft 130 by the urging spring 170. Thereby, a reaction force is exerted on the other end of the urging spring 170 held on the lens holder engaging portion 110b, thereby urging the lens holder 110 against a guide shaft 120 and a guide portion 72.

Unlike the first embodiment, the nut member 160 is pivotally supported on the lens holder 110 about the axis of the pivot shaft 160d in parallel to the guide shaft 120. Thereby, the nut member 160 and the lens holder 110 are integrally movable in the moving direction (the arrow direction 100A and the arrow direction 100B) of the lens holder 110.

The arrangement for urging the lens holder 110 against the guide shaft 120 and the guide portion 72 by the urging spring 170, and the arrangement for urging the nut member 160 against the lens holder 110 by the urging spring 170 are described later in detail.

In the spherical aberration correcting mechanism 101 having the above arrangement, the lens holder 110 is urged against the guide shaft 120 and the guide portion 72 of the optical base 70 by the urging force of the urging spring 170, and the nut member 160 and the lens holder 110 are integrally moved in the optical axis direction (the arrow direction 100A and the arrow direction 100B) of the spherical aberration correcting mechanism 101. This enables to eliminate play between the lens holder 110, and the guide shaft 120 and the guide portion 72; and move the lens holder 110 to an intended position along the guide shaft 120 and the guide portion 72 in the optical axis direction (the arrow direction 100A and the arrow direction 100B) of the spherical aberration correcting mechanism 101 by rotatably driving a stepping motor 140.

Figure 12:
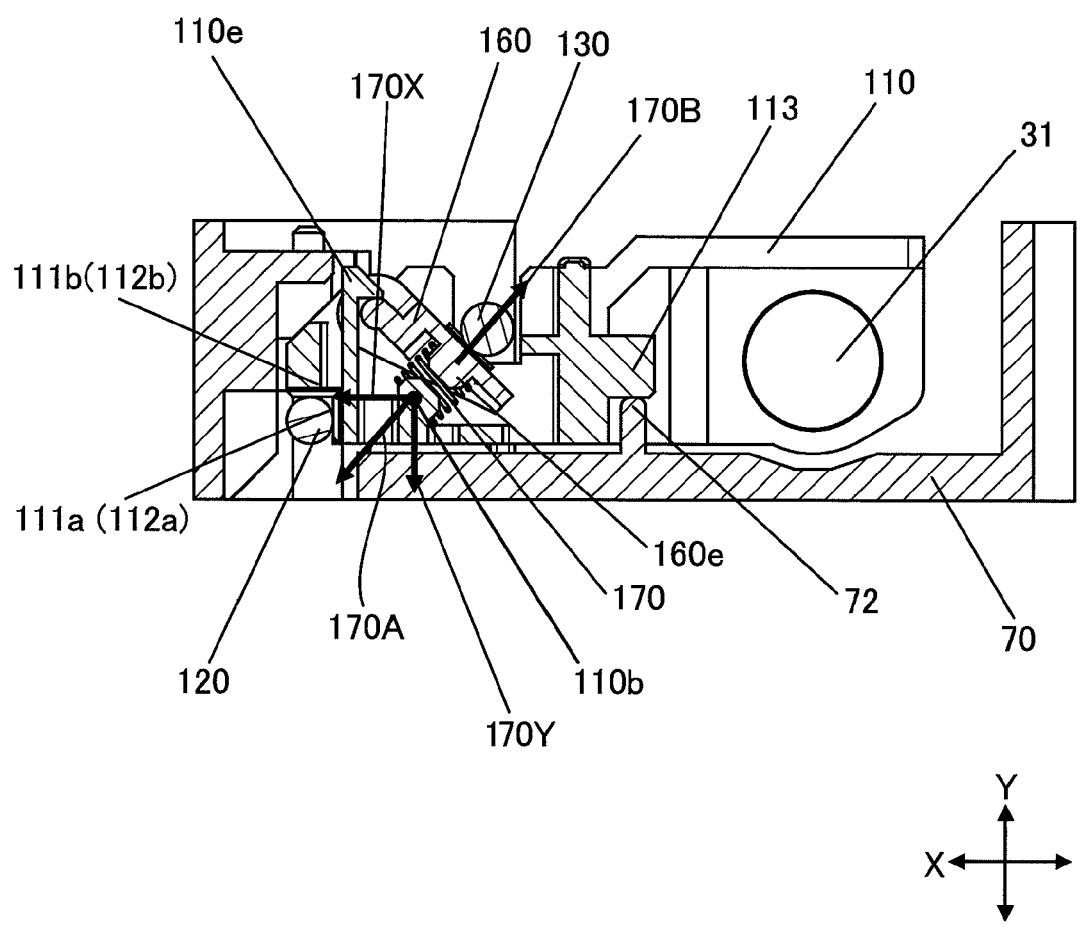
FIG. 12 is a sectional view taken along a plane perpendicular to an optical axis direction of the spherical aberration correcting mechanism in the second embodiment of the invention.
Figure 13:
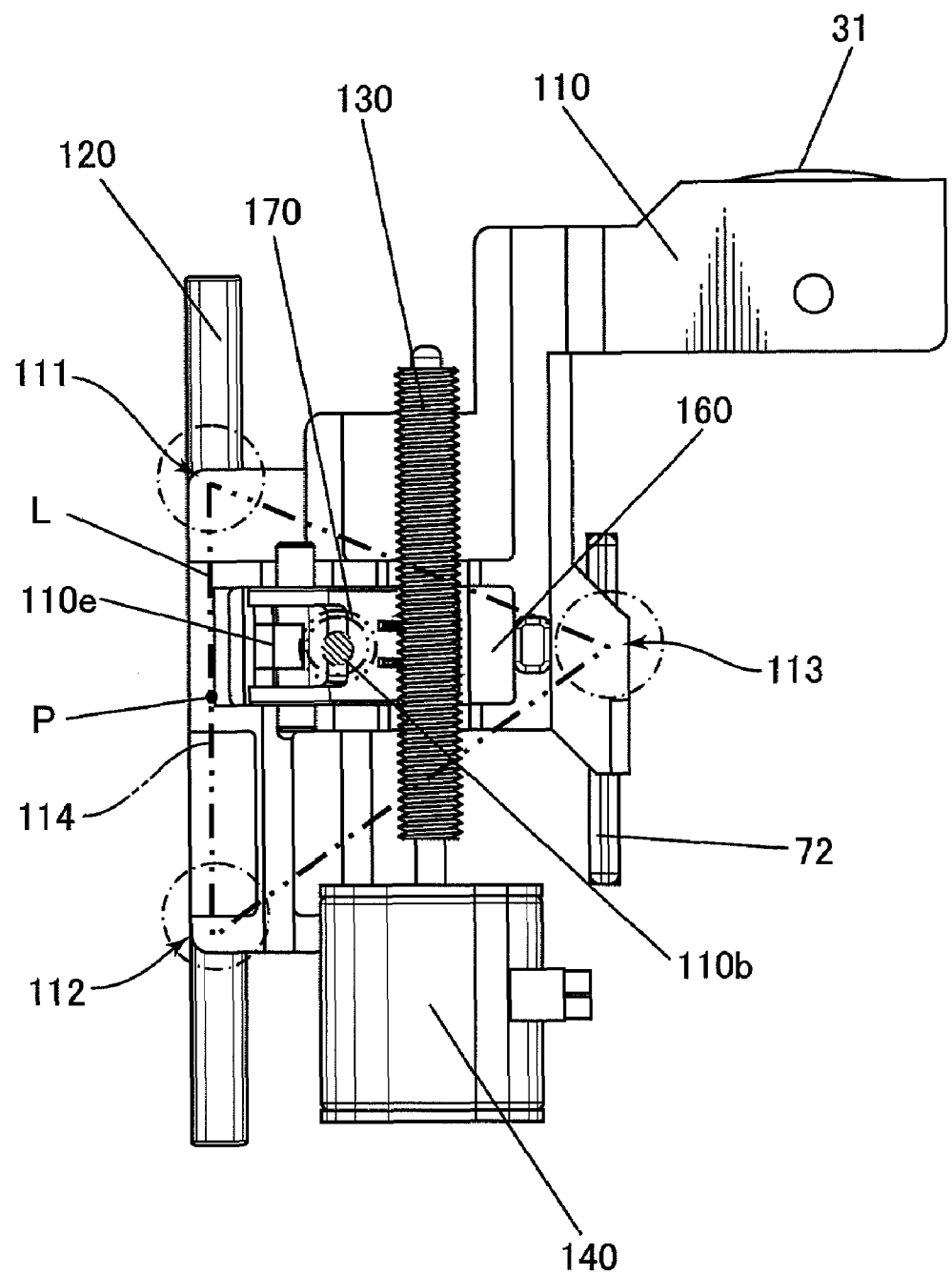
FIG. 13 is a plan view of the spherical aberration correcting mechanism in the second embodiment of the invention.

Next, the urging arrangement of the urging spring 170 in the spherical aberration correcting mechanism 101 having the above arrangement is described referring to FIGS. 12 and 13.

FIG. 12 is a sectional view taken along a plane perpendicular to the optical axis direction (the arrow direction 100A and the arrow direction 100B) of the spherical aberration correcting mechanism 101 in the second embodiment of the invention. FIG. 13 is a plan view of the spherical aberration correcting mechanism in the second embodiment of the invention.

Referring to FIGS. 12 and 13, there is described an arrangement for urging the lens holder 110 against the guide shaft 120 and the guide portion 72 of the optical base 70 by the urging spring 170.

As described above, the motor unit 150 is mounted on the optical base 70 to fix the position of the screw shaft 130. Thereby, as shown in FIG. 12, the urging spring 170 held on the holding portion 160e of the nut member 160, and the lens holder engaging portion 110b of the lens holder 110 is operable to urge the lens holder 110 in the arrow direction 170A and urge the nut member 160 in the arrow direction 170B.

As shown in FIG. 12, the direction of urging force to be exerted on the lens holder engaging portion 110b is aligned with the arrow direction 170A, and has a predetermined angle with respect to X direction and Y direction. The direction of urging force is not in parallel to X direction and Y direction. Accordingly, the urging force to be exerted on the lens holder engaging portion 110b has two urging force components, i.e., one urging force component in the arrow direction 170X in parallel to X direction, and the other urging force component in the arrow direction 170Y in parallel to Y direction.

In the above arrangement, a first X direction contact surface 111a and a second X direction contact surface 112a of the lens holder 110 are urgingly contacted with the guide shaft 120 by the urging force component of the urging spring 170 in the arrow direction 170X. Likewise, a first Y direction contact surface 111b and a second Y direction contact surface 112b of the lens holder 110 are urgingly contacted with the guide shaft 120 by the urging force component of the urging spring 170 in the arrow direction 170Y.

Since the lens holder engaging portion 110b is formed between a first contact portion 111 and a second contact portion 112, and a third contact portion 113, the third contact portion 113 of the lens holder 110 is urgingly contacted with the guide portion 72 of the optical base 70 by the urging force component of the urging spring 170 in the arrow direction 170Y. Thereby, rotation of the lens holder 110 about the axis of the guide shaft 120 is restrained.

By the contact relations between the lens holder 110, and the guide shaft 120 and the guide portion 72 at the above five positions, the lens holder 110 is movably urged along the guide shaft 120 in the arrow direction 100A and the arrow direction 100B.

In the second embodiment, a compression coil spring is used as the urging spring 170. Accordingly, the direction of urging force of the urging spring 170 is definite, and the direction of urging force to be exerted on the lens holder 110 can be defined by a holding surface of the lens holder engaging portion 110b for holding the urging spring 170. In other words, the direction of urging force can be easily changed depending on the shape of the lens holder 110. Accordingly, as compared with the first embodiment, control of the urging force is easy and stable. In this embodiment, the angle of the holding surface of the lens holder engaging portion 110b with respect to X direction is set to 45 degrees to equally exert an urging force in X direction and Y direction.

In this embodiment, an urging force is exerted on the aforementioned five contact surfaces (contact portions) by a single urging force to be exerted on the lens holder engaging portion 110b in the arrow direction 170A. In view of this, the lens holder engaging portion 110b is formed near the centroid of a triangle 114 to be defined by the first contact portion 111, the second contact portion 112, and the third contact portion 113, as shown in FIG. 13. As described in the first embodiment, it is desirable to exert an urging force substantially equally on the first contact portion 111 and the second contact portion 112 so as to move the lens holder 110 in the optical axis direction (the arrow direction 100A and the arrow direction 100B) along the guide shaft 120 as a main guide member. In the second embodiment, as a design matter, as shown in FIG. 13, the lens holder engaging portion 110b is formed at a position slightly displaced from a line segment perpendicular to a line segment "L" connecting the first contact portion 111 and the second contact portion 112 and in parallel to the optical axis direction, and passing through a midpoint "P" of the line segment "L". Arranging the lens holder engaging portion 110b near the line segment perpendicular to the line segment "L" and passing through the midpoint "P" of the line segment "L" is advantageous in sufficiently obtaining the urging effect.

Unlike the first embodiment, in this embodiment, as a design matter, the triangle 114 to be defined by the first contact portion 111, the second contact portion 112, and the third contact portion 113 is not an isosceles triangle with the line segment "L" being a base. However, forming the first contact portion 111, the second contact portion 112, and the third contact portion 113 at such positions that the lens holder engaging portion 110b is formed near the centroid of the triangle 114 to be defined by the first contact portion 111, the second contact portion 112, and the third contact portion 113 is advantageous in stably urging the lens holder 110 against the guide shaft 120 and the guide portion 72.

As described above, the spherical aberration correcting mechanism 101 to be loaded in the optical pickup device in accordance with the second embodiment of the invention is advantageous in precisely driving the lens holder 110 along the guide shaft 120 by urging the lens holder 110 against the guide shaft 120 by the contact surfaces in two directions without play by shaft engagement, unlike the conventional arrangement. Accordingly, the lens holder 110 can be smoothly fed along the guide shaft 120, and control of the spherical aberration correcting mechanism 101 can be stabilized while suppressing shake of the collimator lens 31 in driving the lens holder 110.

Unlike the first embodiment, a compression coil spring is used as the urging spring 170. Accordingly, the direction of urging force of the urging spring 170 is definite, and the direction of urging force to be exerted on the lens holder 110 can be easily changed by the holding surface of the lens holder engaging portion 110b for holding the urging spring 170. Thus, control of the urging force is easy and stable.

In this embodiment, the nut member 160 is pivotally supported on the lens holder 110 about the axis of the pivot shaft 160d in parallel to the guide shaft 120. Accordingly, the lens holder 110 and the nut member 160 can be integrally moved in the moving direction of the lens holder 110 (the arrow direction 100A and the arrow direction 100B). Also, since the nut member 160 is engaged with the lens holder 110 by shaft engagement, the posture of the nut member 160 is stably held with respect to the moving direction of the lens holder 110 without inclination. Thereby, driving of the screw shaft 130 can be stably transmitted to the lens holder 110.

In this embodiment, the angle of the holding surface of the lens holder engaging portion 110b with respect to X direction is set to 45 degrees so as to equally exert an urging force in X direction and Y direction. It is needless to say that substantially the same effect as above is obtained by an angle other than 45 degrees, depending on the weight balance of the lens holder 110, or a design requirement.

In the first and the second embodiments, the urging spring 170 is used as an urging member. Alternatively, an urging member may be constituted of a resilient member other than a spring.

Third Embodiment

Figure 14:
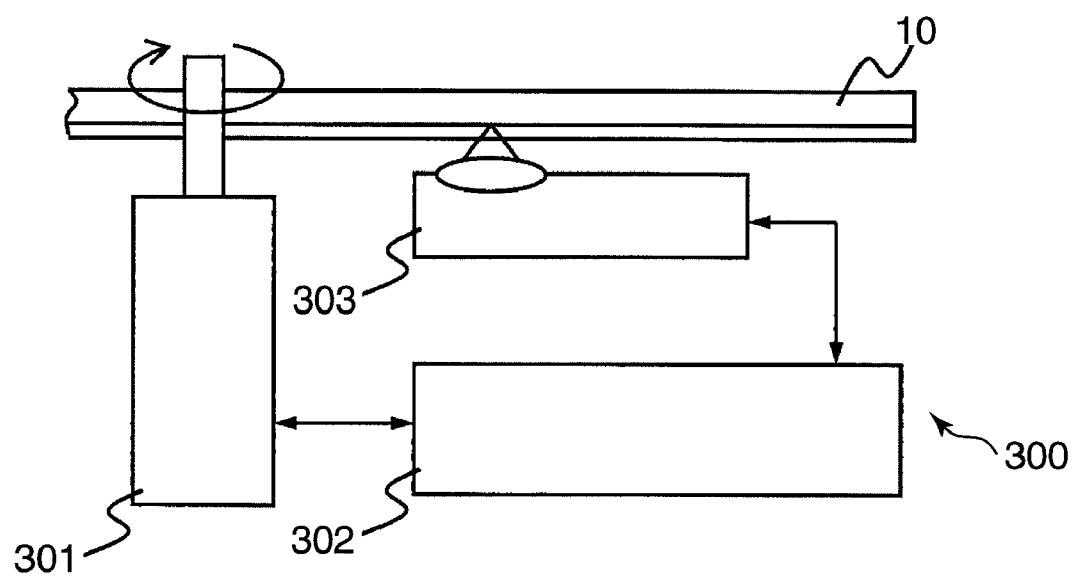
FIG. 14 is a diagram showing a schematic arrangement of an optical disc device in accordance with a third embodiment of the invention.
Figure 15:
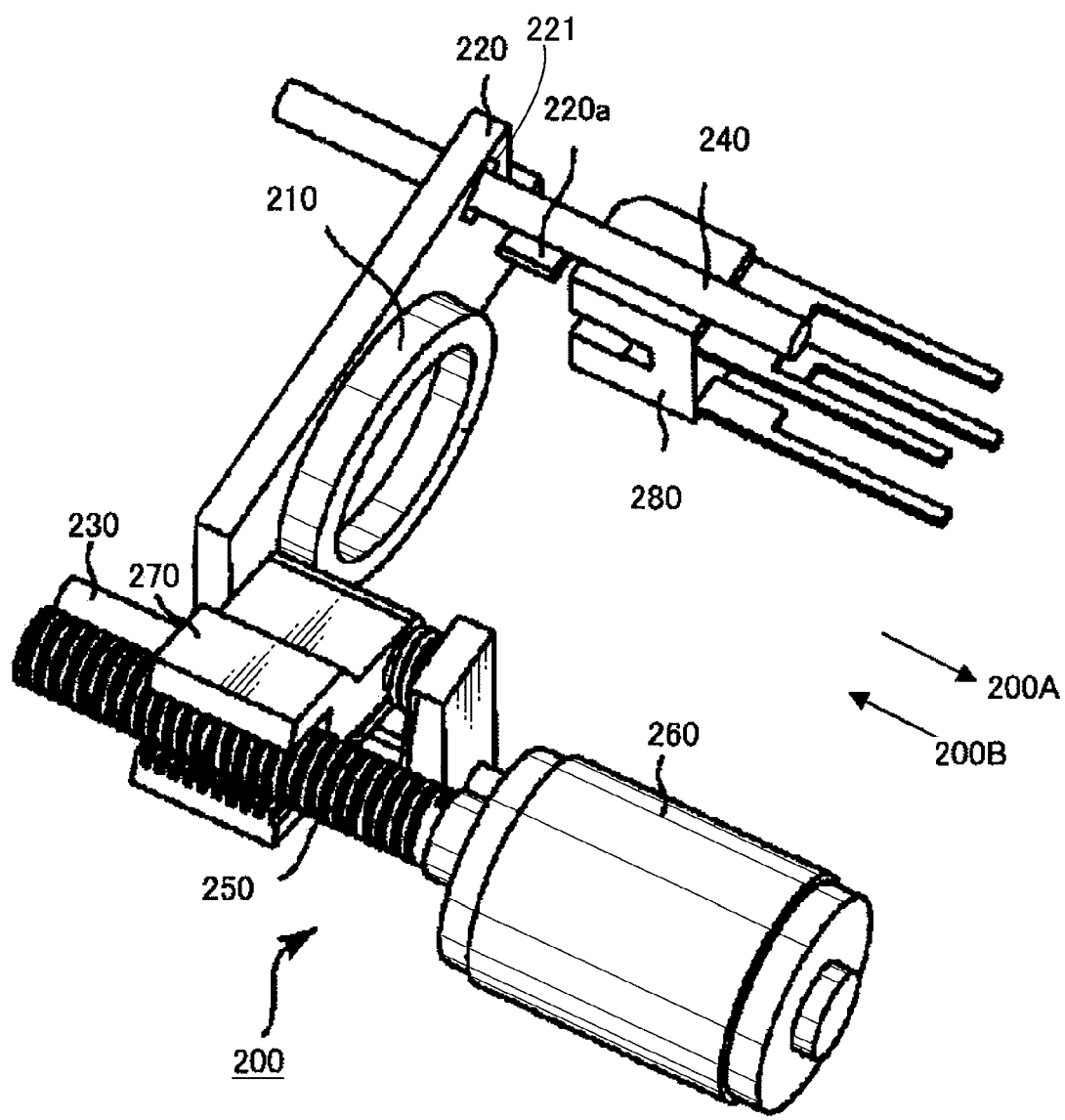
FIG. 15 is a perspective view showing a schematic arrangement of a conventional spherical aberration correcting mechanism.

FIG. 14 is a diagram showing a schematic arrangement of an optical disc device in accordance with the third embodiment of the invention.

Referring to FIG. 14, the optical disc device 300 is internally provided with an optical disc driver 301, a controller 302, and an optical pickup device 303. In FIG. 14, BD is loaded as an optical disc 10 in the optical disc device 300. Alternatively, the optical disc 10 may be DVD or CD.

The optical disc driver 301 is operable to rotatably drive the optical disc 10. The optical pickup device in accordance with the first embodiment or the second embodiment may be used as the optical pickup device 303. The controller 302 controls driving of the optical disc driver 301 and the optical pickup device 303, and processes a control signal and an information signal subjected to photoelectric conversion in the optical pickup device 303. The controller 302 interfaces an information signal with respect to the exterior and the interior of the optical disc device 300.

The controller 302 is operable to perform focus control, tracking control, information reproducing control, and rotation control of the optical disc driver 301 based on a control signal, in response to receiving the control signal from the optical pickup device 303. The controller 302 is operable to reproduce information based on an information signal, and transmit a recorded signal to the optical pickup device 303.

The optical disc device 300 is loaded with the optical pickup device in accordance with the first embodiment or the second embodiment. Accordingly, the optical disc device 300 in accordance with the third embodiment enables to stably drive the correction lens.

The aforementioned embodiments mainly include the inventions having the following features.

An optical pickup device, for use with a light source and an optical disc, according to an aspect of the invention includes: a condensing optical system for condensing a light flux to be emitted from the light source onto the optical disc, the condensing optical system having a correction lens; a lens holder for holding the correction lens; a main guide member and an auxiliary guide member for movably guiding the lens holder in an optical axis direction of the correction lens, while supporting the lens holder; a feed screw arranged in parallel to the optical axis direction; a feed motor for rotating the feed screw; a nut member in engagement with the feed screw and for converting a rotating movement of the feed screw into a rectilinear movement of the lens holder in the optical axis direction; an urging member held on the lens holder and for urging the lens holder against the main guide member and the auxiliary guide member by engagement with the nut member; and an optical base for supporting the main guide member and the auxiliary guide member, wherein the lens holder includes a first contact portion to be contacted with the main guide member at a first position, a second contact portion to be contacted with the main guide member at a second position different from the first position, and a third contact portion to be contacted with the auxiliary guide member, the lens holder is driven in the optical axis direction along the main guide member by the feed motor, the first contact portion and the second contact portion are contacted by the main guide member via an urging force of the urging member, and the third contact portion is contacted by the auxiliary guide member via the urging force of the urging member.

In the above arrangement, the condensing optical system is operable to condense a light flux to be emitted from the light source on an optical disc. The condensing optical system includes the correction lens. The lens holder holds the correction lens. The main guide member and the auxiliary guide member are operable to movably guide the lens holder in the optical axis direction of the correction lens, while supporting the lens holder. The feed screw is arranged in parallel to the optical axis direction. The feed motor is operable to rotate the feed screw. The nut member is in engagement with the feed screw and operable to convert a rotating movement of the feed screw into a rectilinear movement in the optical axis direction. The urging member is held on the lens holder and operable to urge the lens holder against the main guide member and the auxiliary guide member by engagement with the nut member. The optical base supports the main guide member and the auxiliary guide member. The lens holder includes the first contact portion to be contacted with the main guide member at the first position, the second contact portion to be contacted with the main guide member at the second position different from the first position, and the third contact portion to be contacted with the auxiliary guide member. The lens holder is operable to be driven in the optical axis direction along the main guide member by the feed motor, with the first contact portion and the second contact portion being contacted with the main guide member, and the third contact portion being contacted with the auxiliary guide member by the urging force of the urging member.

Since the lens holder for holding the correction lens is urged against the main guide member and the auxiliary guide member by the urging force of the urging member, there is no likelihood that play or backlash by shaft engagement may occur, unlike the conventional arrangement. Accordingly, the lens holder can be precisely driven along the main guide member and the auxiliary guide member. This enables to provide a mechanism for smoothly feeding a correction lens along a main guide member and an auxiliary guide member, and stably drive the correction lens while suppressing shake of the correction lens in driving the lens holder.

In the optical pickup device, preferably, each of the first contact portion and the second contact portion may have a first contact surface for restraining movement of the lens holder in a first restraining direction in parallel to the optical disc on a plane perpendicular to the optical axis direction, and a second contact surface for restraining movement of the lens holder in a second restraining direction substantially perpendicular to the first restraining direction on the plane perpendicular to the optical axis direction.

In the above arrangement, the lens holder is contacted with the main guide member and the auxiliary guide member by the contact surfaces for restraining movement of the lens holder in two directions i.e. the first restraining direction and the second restraining direction. This enables to precisely drive the lens holder along the main guide member and the auxiliary guide member.

In the optical pickup device, preferably, the lens holder may further include a lens holder engaging portion to be engaged with the urging member, and the urging member may be urge the lens holder in the first restraining direction and the second restraining direction by engagement with the lens holder engaging portion.

In the above arrangement, since the lens holder is urged in the two directions i.e. the first restraining direction and the second restraining direction, the lens holder is securely contacted with the main guide member and the auxiliary guide member.

In the optical pickup device, preferably, the lens holder engaging portion may be formed on a plane including a point near a midpoint on a line segment connecting the first contact portion and the second contact portion and in parallel to the optical axis direction, the plane being in parallel to the first restraining direction.

In the above arrangement, the lens holder engaging portion is formed on the plane including the point near the midpoint on the line segment connecting the first contact portion and the second contact portion and in parallel to the optical axis direction, the plane being in parallel to the first restraining direction. This enables to exert an urging force substantially equally on the first contact portion and the second contact portion.

In the optical pickup device, preferably, the lens holder engaging portion may be formed near a centroid of a triangle to be defined by the first contact portion, the second contact portion, and the third contact portion.

In the above arrangement, since the lens holder engaging portion is formed near the centroid of the triangle to be defined by the first contact portion, the second contact portion, and the third contact portion, the lens holder is stably urged against the main guide member. Thereby, the correction lens is precisely driven along the main guide member.

In the optical pickup device, preferably, the urging member may include an urging spring, and the lens holder may be urged in the first restraining direction and the second restraining direction by the urging spring. In this arrangement, since the lens holder is urged in the first restraining direction and the second restraining direction by the single urging spring, the number of parts of the optical pickup device is reduced.

In the optical pickup device, preferably, the urging member may be contact the nut member with the lens holder by urging the nut member in the optical axis direction.

In the above arrangement, since the nut member is urged in the optical axis direction by the urging member, the nut member is contacted with the lens holder to thereby move the lens holder in the optical axis direction.

In the optical pickup device, preferably, the auxiliary guide member may be constituted of a part of the optical base. In this arrangement, the auxiliary guide member is formed in molding the optical base, which is advantageous in easily forming the auxiliary guide member.

In the optical pickup device, preferably, the main guide member may be constituted of a shaft with a surface thereof being polished. In this arrangement, since the main guide member is constituted of the shaft with the surface thereof being polished, rectilinear precision and wear resistance in driving the lens holder are improved, and high reliability is secured.

An optical disc device according to another aspect of the invention includes the optical pickup device having any one of the above arrangements, a motor for rotatably driving the optical disc, and a controller for controlling the optical pickup device and the motor. In this arrangement, the optical pickup device having any one of the above arrangements is applied to the optical disc device.

The inventive optical pickup device is suitable as an optical pickup device capable of recording and/or reproducing information with respect to an optical disc having high recording density, and is advantageous in stably driving a correction lens while suppressing shake of the correction lens in driving a lens holder. Since the inventive optical pickup device has a simplified arrangement, the inventive optical pickup device is suitably used as an optical pickup device having a reduced number of parts and improved assembling performance.

This application is based on Japanese Patent Application No. 2008-129405 filed on May 16, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical pickup device, for use with a light source and an optical disc, said optical pickup device comprising:
   a condensing optical system for condensing a light flux to be emitted from the light source onto the optical disc, the condensing optical system including a correction lens;
   a lens holder for holding the correction lens;
   a main guide member and an auxiliary guide member for movably guiding the lens holder in an optical axis direction of the correction lens, while supporting the lens holder;
   a feed screw arranged in parallel to the optical axis direction;
   a feed motor for rotating the feed screw;
   a nut member in engagement with the feed screw and for converting a rotating movement of the feed screw into a rectilinear movement of the lens holder in the optical axis direction;
   an urging member held on the lens holder and for urging the lens holder against the main guide member and the auxiliary guide member by engagement with the nut member; and an optical base for supporting the main guide member and the auxiliary guide member, wherein the lens holder includes a first contact portion to be contacted with the main guide member at a first position, a second contact portion to be contacted with the main guide member at a second position different from the first position, and a third contact portion to be contacted with the auxiliary guide member, the lens holder is driven in the optical axis direction along the main guide member by the feed motor, the first contact portion and the second contact portion are contacted by the main guide member via an urging force of the urging member, and the third contact portion is contacted by the auxiliary guide member via the urging force of the urging member.

2. The optical pickup device according to claim 1, wherein each of the first contact portion and the second contact portion has a first contact surface for restraining movement of the lens holder in a first restraining direction in parallel to the optical disc on a plane perpendicular to the optical axis direction, and a second contact surface for restraining movement of the lens holder in a second restraining direction substantially perpendicular to the first restraining direction on the plane perpendicular to the optical axis direction.

3. The optical pickup device according to claim 2, wherein the lens holder further includes a lens holder engaging portion to be engaged with the urging member, and the urging member urges the lens holder in the first restraining direction and the second restraining direction by engagement with the lens holder engaging portion.

4. The optical pickup device according to claim 3, wherein the lens holder engaging portion is formed on a plane including a point near a midpoint on a line segment connecting the first contact portion and the second contact portion and in parallel to the optical axis direction, the plane being in parallel to the first restraining direction.

5. The optical pickup device according to claim 4, wherein the lens holder engaging portion is formed near a centroid of a triangle to be defined by the first contact portion, the second contact portion, and the third contact portion.

6. The optical pickup device according to claim 2, wherein the urging member includes an urging spring, and the lens holder is urged in the first restraining direction and the second restraining direction by the urging spring.

7. The optical pickup device according to claim 1, wherein the urging member contacts the nut member with the lens holder by urging the nut member in the optical axis direction.

8. The optical pickup device according to claim 1, wherein the auxiliary guide member is constituted of a part of the optical base.

9. The optical pickup device according to claim 1, wherein the main guide member is constituted of a shaft with a surface thereof being polished.

10. An optical disc device comprising:

the optical pickup device of claim 1, a motor for rotatably driving the optical disc; and a controller for controlling the optical pickup device and the motor.

* * * * *